United States Patent
Lu et al.

(10) Patent No.: US 10,652,790 B2
(45) Date of Patent: May 12, 2020

(54) METHOD FOR DISTINGUISHING MEASUREMENT OBJECT, BASE STATION AND USER EQUIPMENT

(71) Applicant: Baicells Technologies Co. Ltd., Beijing (CN)

(72) Inventors: Yang Lu, Beijing (CN); Lixin Sun, Beijing (CN); Yingzhe Ding, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 0 days.

(21) Appl. No.: 16/309,610

(22) PCT Filed: Jun. 13, 2017

(86) PCT No.: PCT/CN2017/088003
§ 371 (c)(1),
(2) Date: Dec. 13, 2018

(87) PCT Pub. No.: WO2017/215584
PCT Pub. Date: Dec. 21, 2017

(65) Prior Publication Data
US 2019/0182729 A1    Jun. 13, 2019

(30) Foreign Application Priority Data
Jun. 13, 2016 (CN) .......................... 2016 1 0420757

(51) Int. Cl.
*H04W 24/10* (2009.01)
*H04W 36/00* (2009.01)

(52) U.S. Cl.
CPC ....... *H04W 36/0094* (2013.01); *H04W 24/10* (2013.01)

(58) Field of Classification Search
CPC .. H04W 24/08; H04W 36/0094; H04L 5/0032
See application file for complete search history.

(56) References Cited

U.S. PATENT DOCUMENTS

| | | | |
|---|---|---|---|
| 2014/0161103 A1* | 6/2014 | Sirotkin | H04W 24/10 370/332 |
| 2014/0204791 A1 | 7/2014 | Teng et al. | |

(Continued)

FOREIGN PATENT DOCUMENTS

| | | |
|---|---|---|
| CN | 102036288 A | 4/2011 |
| CN | 103621130 A | 3/2014 |

(Continued)

OTHER PUBLICATIONS

"International Application Serial No. PCT/CN2017/088003, Search Report and Written Opinion dated Jul. 27, 2017", 17 pgs.

(Continued)

*Primary Examiner* — Myron Wyche
(74) *Attorney, Agent, or Firm* — Kwan & Olynick LLP

(57) ABSTRACT

A method for distinguishing a measurement object, a base station and a UE are provided. The method includes: in case of determining to configure the UE to perform measurement to a neighboring cell, generating measurement configuration for the neighboring cell, wherein the measurement configuration includes a measurement object configuration IE and a measurement report configuration IE, and the measurement object configuration IE or a combination of the measurement object configuration IE and the measurement report configuration IE is used to indicate a RAT type of the measurement configuration; transmitting the measurement configuration to the UE so as to instruct the UE to perform measurement to a measurement object indicated in the measurement configuration; and receiving a measurement result message transmitted by the UE through a measurement result report IE after the UE performs the measurement to the measurement object.

20 Claims, 12 Drawing Sheets

(56) References Cited

U.S. PATENT DOCUMENTS

2016/0330641 A1* 11/2016 Zhang ................ H04W 24/02
2017/0346609 A1* 11/2017 Li ...................... H04L 5/0032

FOREIGN PATENT DOCUMENTS

| CN | 105208593 A | 12/2015 | | |
|---|---|---|---|---|
| WO | 2015047002 A1 | 4/2015 | | |
| WO | WO/2015/109516 | * | 7/2015 | ............ H04W 24/08 |
| WO | WO 2015109516 A1 | 7/2015 | | |

OTHER PUBLICATIONS

"Chinese Application Serial No. 201610420757.5, Office Action dated Jan. 16, 2020", 13 pgs.

\* cited by examiner

METHOD FOR DISTINGUISHING MEASUREMENT OBJECT, BASE STATION AND USER EQUIPMENT

CROSS-REFERENCE TO RELATED APPLICATION

The present application is a U.S. national phase application of PCT Application No. PCT/CN2017/088003 filed on Jun. 13, 2017, which claims a priority of a Chinese patent application No. 201610420757.5 filed in China on Jun. 13, 2016, a disclosure of which is incorporated herein in its entirety by reference.

TECHNICAL FIELD

The present disclosure relates to a field of communication technology, and in particular, relates to a method for distinguishing a measurement object, a base station, and a User Equipment (UE).

BACKGROUND

In a technique named Licensed Assistant Access (LAA) specified by a standard organization of 3rd Generation Partnership Project (3GPP), a carrier in a non-licensed frequency band uses a physical layer technique conforming to a Long Term Evolution (LTE) standard. In order to ensure a device based on the LAA and another device operating in the non-licensed frequency band (such as a Wireless Fidelity (WiFi) device) to occupy a channel in the non-licensed frequency band equally and in order to avoid interference between devices operating in the non-licensed frequency band, a mechanism called Listen Before Talk (LBT) similar to a carrier sense technique in the WiFi is introduced to a physical layer of the LAA regarding a carrier in the non-licensed frequency band. In case that a base station or a User Equipment (UE) senses that a channel in the non-licensed frequency band is occupied, i.e. in case that the LBT fails, the base station or the UE stops transmitting a signal. In case that the base station or the UE senses that the channel is clear, i.e., in case that the LBT succeeds, the base station or the UE transmits a signal. A carrier in the non-licensed frequency band cannot operate independently in the UE operating in the non-licensed frequency band. A carrier aggregation technique has to be used to aggregate the carrier in the non-licensed frequency band and a carrier in a licensed frequency band. The carrier in the licensed frequency band may function as a Primary Cell (PCell) serving the UE, and the carrier in the non-licensed frequency band may function as a Secondary Cell (SCell) serving the UE.

MulteFire (MF) is also a radio access technique based on the LTE and using the non-licensed frequency band. Different from the LAA, the technique, MulteFire, may operate in the non-licensed frequency band independently without an aid of the licensed frequency band. The mechanism called the LBT is also introduced to a physical layer of the MulteFire so as to prevent interference among devices.

Carriers in the non-licensed frequency band in the technique LAA of the 3GPP and the technique MF use 38 frequency bins between 5150 MHz and 5929 MHz as center frequency bins. In the LTE, a channel in each usable operating frequency band (Band) is identified by an Evolved UMTS Terrestrial Radio Access Network (E-UTRAN) Absolute Radio Frequency Channel Number (EARFCN). A value range of the EARFCN is 0-262143. A relation between the EARFCN and center frequency bins of a channel in the operating frequency band (Band) is as follow:

$$F_{DL}=F_{DL\_low}+0.1(N_{DL}-N_{Offs-DL})$$

$$F_{UL}=F_{UL\_low}+0.1(N_{UL}-N_{Offs-UL})$$

wherein, $F_{DL\_low}$ is a lowest frequency value in a downlink operating frequency band. $F_{DL}$ is a center frequency bin of a channel in the downlink operating frequency band, $N_{DL}$ is a downlink EARFCN, $N_{Offs-DL}$ is an EARFCN offset in the downlink operating frequency band, $F_{UL-low}$ is a lowest frequency value in a uplink operating frequency band, $F_{UL}$ is a center frequency bin of a channel in a uplink operating frequency band, $N_{UL}$ is a uplink EARFCN, and $N_{Offs-UL}$ is an EARFCN offset in the uplink operating frequency band.

68 operating frequency bands are included in the LTE. As shown in a table below, the carriers in the non-licensed frequency band in the technique LAA of the 3GPP and the technique MF use an operating frequency band. Band 46, in a frequency range from 5150 MHz to 5929 MHz, i.e., the carriers in the LAA and the MFC use frequency bins in Band 46 in the non-licensed frequency band.

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |

-continued

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| $29^2$ | 717 | 9660 | 9660-9769 | | N/A | |
| 30 | 2350 | 9770 | 9770-9869 | 2305 | 27660 | 27660-27759 |
| 31 | 462.5 | 9870 | 9870-9919 | 452.5 | 27760 | 27760-27809 |
| $32^2$ | 1452 | 9920 | 9920-10359 | | N/A | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |
| 45 | 1447 | 46590 | 46590-46789 | 1447 | 46590 | 46590-46789 |
| $46^4$ | 5150 | 46790 | 46790-54539 | 5150 | 46790 | 46790-54539 |
| ... | | | | | | |
| 64 | | | Reserved | | | |
| 65 | 2110 | 65536 | 65536-66435 | 1920 | 131072 | 131072-131971 |
| $66^5$ | 2110 | 66436 | 66436-67335 | 1710 | 131972 | 131972-132671 |
| $67^2$ | 738 | 67336 | 67336-67535 | | N/A | |
| 68 | 753 | 67536 | 67536-67835 | 698 | 132672 | 132672-132971 |

In the LAA of the LTE, in order to add or remove a SCell of the LAA serving the UE, a base station in the LTE indicates, through measurement configuration in a Radio Resource Control (RRC) signaling message, the UE to measure a signal quality of a neighboring cell of the LAA, and determines whether the SCell of the LAA serving the UE is to be added or removed according to the signal quality reported by the UE after the UE measured the signal quality of a channel of the LAA. For example, in case that the signal quality of the neighboring cell of the LAA is at least higher than a signal quality of a current serving cell by a predetermined threshold, the base station adds the neighboring cell of the LAA as the SCell serving the UE.

A relevant 3GPP standard supports the UE to hand over from a LTE-based network to another network based on other radio access technologies (RAT), such as a GSM/EDGE radio access network (GERAN), a UMTS radio access network (UTRAN), a CDMA2000 network, a UMTS terrestrial radio access (UTRA) network, and a wireless area network (WLAN). In order to enable the UE to hand over from the LTE-based network to another network based on other RATs, the base station in the LTE indicates, through the measurement configuration in the RRC signaling message, the UE to perform measurement to a neighboring cell, and determines whether the UE should hand over to neighboring cells based on the other RATs, according to the signal quality reported by the UE after the UE performs the measurement to a channel in the GERAN, the UTRAN, the CDMA2000, the UTRA or the WLAN.

The base station notifies, through a measurement object in the measurement configuration in the RRC message, the UE to measure a channel quality of a cell based on other RATs or other frequency bands at center frequency bins (i.e. EARFCN) of the other RATs or the other frequency bands. At present, the base station uses a measurement object (MeasObjectEURA) carrying the EARFCN in the Band 46 to indicate the UE to measure the channel quality of the neighboring cell of the LAA at frequency bins corresponding to the EARFCN. However, after the MulteFire (MF) technique is introduced, if a handover process from the LTE-based network to a MF-based network is to be supported, the UE needs to be instructed to measure a channel quality of a neighboring cell of the MF. Since both the MF and the LAA use channel frequency bins in the Band 46 in the non-licensed frequency band, the measurement object (MeasObjectEUTRA) including the EARFCN in the Band 46 cannot indicate the measurement object is directed to measurement to the neighboring cell of the LAA or measurement to the neighboring cell of the MF. How to make the base station be capable of distinguish the measurement object instructed for the LAA from the measurement object instructed for MF is a problem to be solved.

SUMMARY

In view of the above, a method for distinguishing a measurement object, a base station and a user equipment (UE) are provided in the present disclosure so that the base station may distinguish a measurement object.

To solve the above technical problem, a method for distinguishing a measurement object is provided in the present disclosure. The method is used in a base station, and includes: in case of determining to configure a User Equipment (UE) to perform measurement to a neighboring cell, generating a measurement configuration for the neighboring cell, wherein the measurement configuration include a measurement object configuration Information Element (IE) and a measurement report configuration IE, and the measurement object configuration IE or a combination of the measurement object configuration IE and the measurement report configuration IE is used to indicate a radio access technology (RAT) type of the measurement configuration; transmitting the measurement configuration to the UE so as to instruct the UE to perform measurement to a measurement object indicated in the measurement configuration; and receiving a measurement result message, the measurement result message being transmitted by the UE through a measurement result report IE after the UE performs the measurement to the measurement object.

A method for distinguishing a measurement object is further provided in the present disclosure. The method is used in a User Equipment (UE), and includes: receiving a measurement configuration transmitted from a base station, wherein the measurement configuration includes a measurement object configuration IE and a measurement report configuration IE for a neighboring cell needing to be measured by the UE; obtaining a Radio Access Technology (RAT) type of the measurement configuration according to the measure object configuration Information Element (IE) or a combination of the measurement object configuration IE and the measurement report configuration IE; performing measurement to a measurement object indicated in the measurement configuration; transmitting, to the base station through a measurement result report IE, a channel quality measurement result of the neighboring cell indicated in the measurement configuration, in case that the channel quality measurement result satisfies a measurement report rule indicated by the measurement report configuration IE included in the measurement configuration.

A base station is further provided in the present disclosure, and includes: a first generation module, configured to, in case of determining to configure a User Equipment (UE) to perform measurement to a neighboring cell, generate a measurement configuration for the neighboring cell, wherein the measurement configuration includes a measurement object configuration information element (IE) and a measurement report configuration IE, and the measurement object configuration IE or a combination of the measurement object configuration IE and the measurement report configuration IE is used to indicate a Radio Access Technology (RAT) type of the measurement configuration; a first transmission module, configured to transmit the measurement configuration to the UE so as to instruct the UE to perform measurement to a measurement object indicated in the measurement configuration; and a first reception module, configured to receive a measurement result message transmitted by the UE through a measurement result report IE after the UE performs the measurement to the measurement object.

A User Equipment (UE) is further provided in the present disclosure, and includes: a reception module, configured to receive a measurement configuration transmitted from a base station, wherein the measurement configuration includes a measurement object configuration Information Element (IE) and a measurement report configuration IE of a neighboring cell needing to be measured by the UE; an acquisition module, configured to acquire a radio access technology (RAT) type of the measurement configuration according to the measurement object configuration IE or a combination of the measurement object configuration IE and the measurement report configuration IE; a measurement module, configured to perform measurement to a measurement object indicated in the measurement configuration; and a first report module, configured to transmit a channel quality measurement result of the neighboring cell indicated in the measurement configuration to the base station through the measurement result report IE, in case that the channel quality measurement result satisfies a measurement report rule indicated by the measurement report configuration IE included in the measurement configuration.

A base station is further provided in the present disclosure, and includes: a processor, a receiver and a transmitter, wherein the processor is configured to, in case of determining to configure a User Equipment (UE) to perform measurement to a neighboring cell, generate a measurement configuration for the neighboring cell, wherein the measurement configuration include a measurement object configuration Information Element (IE) and a measurement report configuration IE, and the measurement object configuration IE or a combination of the measurement object configuration IE and the measurement report configuration IE is used to indicate a radio access technology (RAT) type of the measurement configuration; the transmitter is connected to the processor and is configured to transmit the measurement configuration to the UE so as to instruct the UE to perform measurement to a measurement object indicated in the measurement configuration; the receiver is connected to the processor and is configured to receive a measurement result message transmitted by the UE through a measurement result report IE after the UE performs the measurement to the measurement object.

A User Equipment (UE) is further provided in the present disclosure, and includes: a processor, a receiver and a transmitter, wherein the receiver is configured to receive a measurement configuration transmitted from a base station, the measurement configuration includes a measurement object configuration Information Element (IE) and a measurement report configuration IE for a neighboring cell needing to be measured by the UE; the processor is connected to the receiver and is configured to obtain a radio access technology (RAT) type of the measurement configuration according to the measurement object configuration IE or a combination of the measurement object configuration IE and the measurement report configuration IE; and perform measurement to the measurement object indicated in the measurement configuration; the transmitter is connected to the processor and is configured to transmit, to the base station through a measurement result report IE, a channel quality measurement result of the neighboring cell indicated in the measurement configuration, in case that the channel quality measurement result satisfies a measurement report rule indicated by the measurement report configuration IE included in the measurement configuration.

The technical solutions of the present disclosure have advantages as follow. A RAT type of a neighboring cell needing to be measured by the UE is indicated by a measurement object configuration IE or a combination of the measurement object configuration IE and the measurement report configuration IE in the measurement configuration so as to facilitate subsequent operations between the base station and the UE.

DETAILED DESCRIPTION

Detailed description will be given hereinafter in conjunction with drawings and embodiments of the present disclosure. The following embodiments are used to illustrate the present disclosure, but do not limit the scope of the present disclosure.

Figure 1:
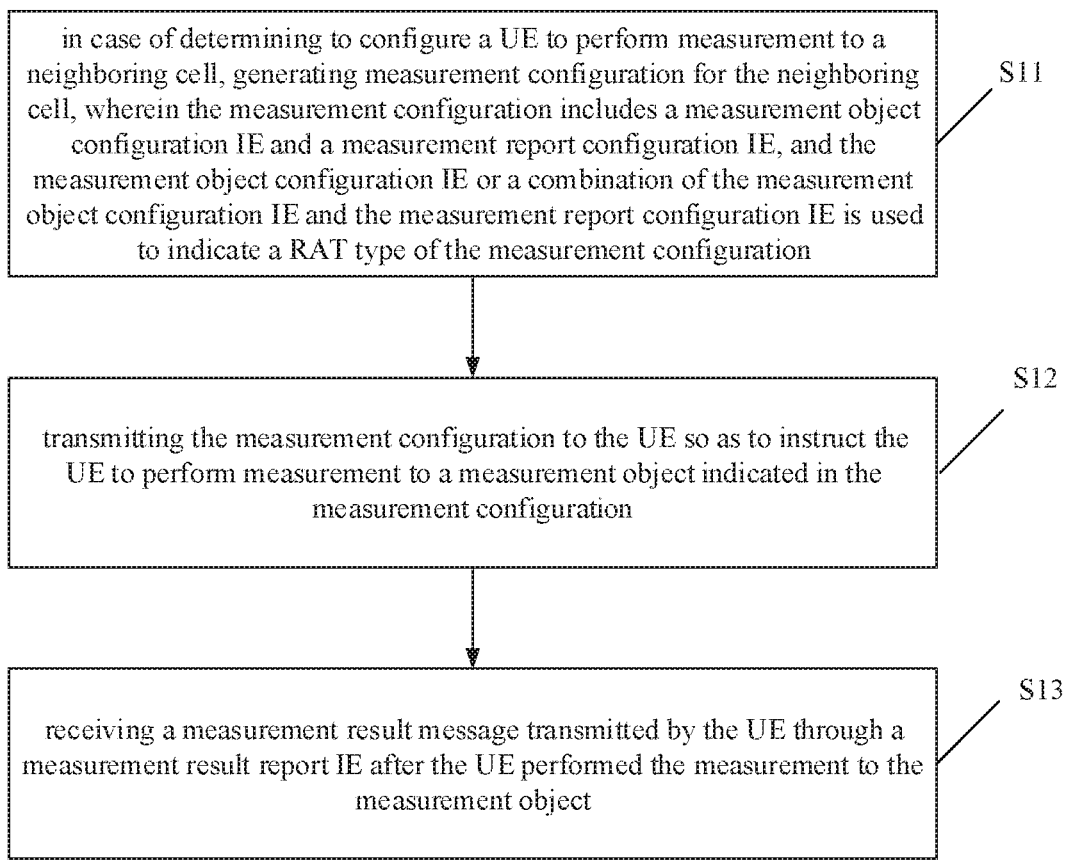
FIG. 1 is a flowchart of a method for distinguishing a measurement object according to some embodiments of the present disclosure.

Referring to FIG. 1, FIG. 1 is a flowchart of a method for distinguishing a measurement object according to some embodiments of the present disclosure. The method for distinguishing the measurement object is applied in a base station, and the method includes steps S11 to S13.

Step S11: in case of determining to configure a User Equipment (UE) to perform measurement to a neighboring cell, generating a measurement configuration for the neighboring cell, wherein the measurement configuration includes a measurement object configuration Information Element (IE) and a measurement report configuration IE, and the measurement object configuration IE or a combination of the measurement object configuration IE and the measurement report configuration IE is used to indicate a radio access technology (RAT) type of the measurement configuration. The RAT type includes, but is not limited to, a MulteFire (MF), a Licensed Assistant Access (LAA), a Wireless Local Area Network (WLAN), or an Evolved-UMTS Terrestrial Radio Access network (E-UTRAN).

Step S12: transmitting the measurement configuration to the UE so as to instruct the UE to perform measurement to a measurement object indicated in the measurement configuration.

Step S13: receiving a measurement result message, the measurement result message being transmitted by the UE through a measurement result report IE after the UE performs the measurement to the measurement object.

In some embodiments of the present disclosure, the RAT type of a neighboring cell needing to be measured by the UE is indicated through the measurement object configuration IE or the combination of the measurement object configuration IE and the measurement report configuration IE, so as to facilitate subsequent operations between the base station and the UE, such as handing over from a LTE-based network to a MF-based network.

Figure 2:
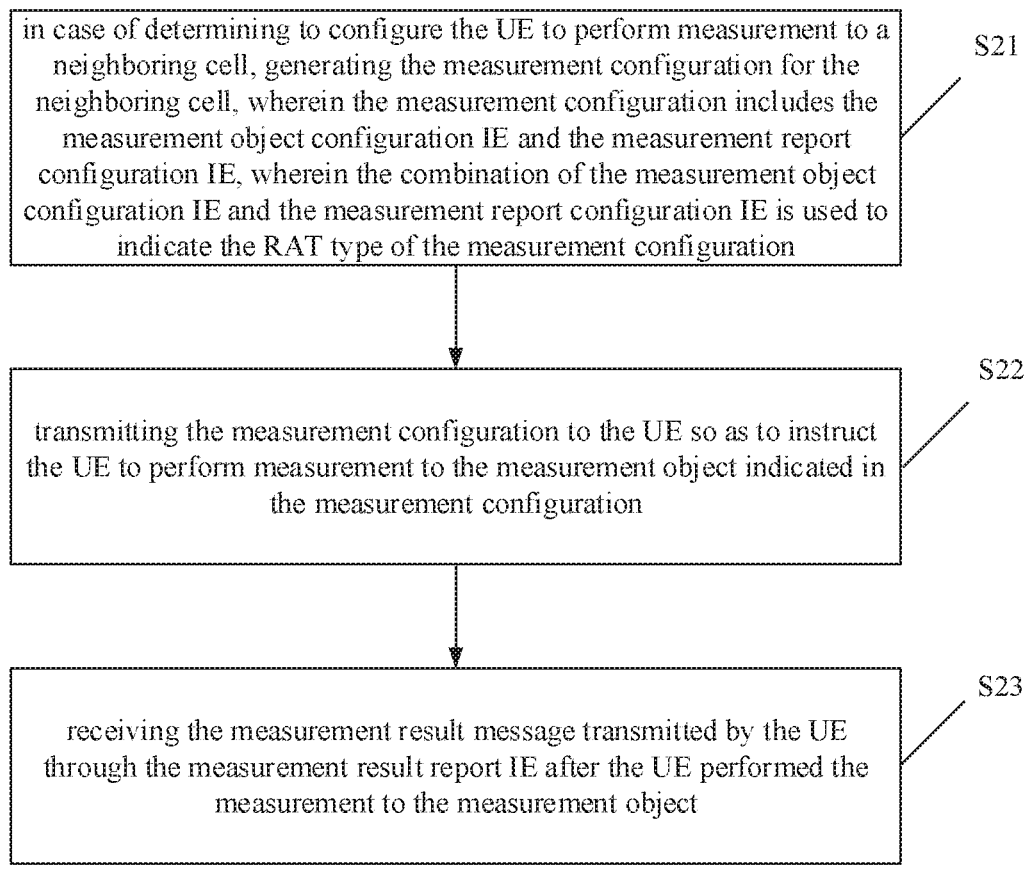
FIG. 2 is a flowchart of a method for distinguishing a measurement object according to some embodiments of the present disclosure.

Referring to FIG. 2, FIG. 2 is a flowchart of a method for distinguishing a measurement object according to some embodiments of the present disclosure. The method for distinguishing the measurement object is applied in the base station, and the method includes steps S21 to S23.

Step S21: in case of determining to configure the UE to perform measurement to a neighboring cell, generating the measurement configuration for the neighboring cell, wherein the measurement configuration includes the measurement object configuration IE and the measurement report configuration IE, wherein the combination of the measurement object configuration IE and the measurement report configuration IE is used to indicate the RAT type of the measurement configuration. The RAT type includes, but is not limited to, the MF, the LAA, the WLAN, or the E-UTRAN.

Step S22: transmitting the measurement configuration to the UE so as to instruct the UE to perform measurement to the measurement object indicated in the measurement configuration.

Step S23: receiving the measurement result message, the measurement result message being transmitted by the UE through the measurement result report IE after the UE performs the measurement to the measurement object.

A Radio Resource Control (RRC) protocol in the LTE provides measurement object configuration IEs for various RATs and measurement report configuration IEs for various RATs. The measurement object configuration IEs may include for example MeasObjectEUTRA, MeasObjectGERAN, MeasObjectUTRA, MeasObjectCDMA2000, and MeasObjectWLAN-r13, which are measurement object configurations for neighboring cells of the E-UTRAN, the GERAN, the UTRAN, the CDMA 2000, the UTRA, and the WLAN, respectively. The MeasObjectEUTRA includes a measurement object configuration for a channel in the licensed frequency band and a measurement object configuration for a channel in the non-licensed frequency band. The measurement object in the licensed frequency band is distinguished from the measurement object in the non-licensed frequency band through the EARFACN in the MeasObjectEUTRA. The measurement report configuration IE may include for example ReportConfigEUTRA and Inter-RAT which are measurement report configurations for neighboring cells of the E-UTRAN and the WLAN, respectively.

Three kinds of RATs may use channel frequency bins in the non-licensed frequency band, and include the LAA, the WLAN and the ME In some embodiments of the present disclosure, the measurement object configuration IEs and the measurement report configuration IEs for various RATs provided in the RRC Protocol in the LTE may be used to configure the measurement configurations for the neighboring cells of the LAA, the WLAN and the MF. Ways in which the measurement configurations for the neighboring cells of the LAA, the WLAN and the MF are configured will be described hereinafter.

(1) in case of determining to configure the UE to perform measurement to a neighboring cell of the MF, generating the measurement configuration for the neighboring cell of the MF, wherein the measurement object configuration IE is a measurement object configuration IE of the WLAN, and the measurement object for the neighboring cell of the MF is configured by using the measurement object configuration IE of the WLAN; the measurement report configuration IE is the measurement report configuration IE of the E-UTRAN, and the measurement report configuration IE for the neighboring cell of the MF is configured by using the measurement report configuration IE of the E-UTRAN, and a combination of the measurement object configuration IE of the WLAN and the measurement report configuration IE of the E-UTRAN is used to indicate that the RAT type of the measurement configuration is the MF.

In such as case, the receiving the measurement result message transmitted by the UE through the measurement result report IE after the UE performs the measurement to the measurement object, includes: in case of configuring the UE to perform the measurement to the neighboring cell of the MF, receiving the measurement result message transmitted by the UE through the measurement result report IE of the E-UTRAN after the UE performs the measurement to the measurement object.

Specifically, the measurement object configuration IE of the WLAN is MeasObjectWLAN-r13, the measurement report configuration IE of the E-UTRAN is ReportConfigEUTRA, and the measurement result report IE of the E-UTRAN is MeasResultEUTRA.

(2) in case of determining to configure the UE to perform measurement to the neighboring cell of the E-UTRAN or of the LAA, generating the measurement configuration for the neighboring cell of the E-UTRAN or the in LAA, wherein the measurement object configuration IE is the measurement object configuration IE of the E-UTRAN, and the measurement object for the neighboring cell of the E-UTRAN or of the LAA is configured by using the measurement object configuration IE of the E-UTRAN; the measurement report configuration IE is the measurement report configuration IE of the E-UTRAN, and the measurement report of the neighboring cell of the E-UTRAN or the in LAA is configured by using the measurement report configuration IE of the E-UTRAN, and a combination of the measurement object configuration IE of the E-UTRAN and the measurement report configuration IE of the E-UTRAN is used to indicate that the RAT type of the measurement configuration is the E-UTRAN or the LAA. Specifically, the measurement object configuration IE of the E-UTRAN is MeasObjectEUTRA, and the measurement report configuration IE of the E-UTRAN is ReportConfigEUTRA.

(3) in case of determining to configure the UE to perform measurement to a neighboring cell of the WLAN, generating the measurement configuration for the neighboring cell of the WLAN, wherein the measurement object configuration IE is a measurement object configuration IE of the WLAN, and the measurement object for the cell of the WLAN is configured by using the measurement object configuration IE of the WLAN: the measurement report configuration IE is the measurement report configuration IE of the inter-RAT, and the measurement report of the cell of the WLAN by using the measurement report configuration IE of the inter-RAT, and a combination of the measurement object configuration IE of the WLAN and the measurement report configuration IE of the inter-RAT is used to indicate that the RAT type of the measurement configuration is the WLAN.

Specifically, the measurement object configuration IE of the WLAN is MeasObjectWLAN-r13, and the measurement report configuration IE of the inter-RAT is ReportConfigInterRAT.

In some embodiments of the present disclosure, measurement report configuration IEs for neighboring cells of the MF and of the LAA use the ReportConfigEUTRA, and the base station may distinguish the measurement object for the neighboring cell of the MF from the measurement object for the neighboring cell of the LAA by using the measurement object configuration IEs, i.e., the MeasObjectWLAN-r13 or the MeasObjectEUTRA, so as to prevent the UE from confusing the measurement object for the MF with the measurement object for the LAA. Measurement object configuration IEs for the cells of the WLAN and of the MF use the MeasObjectWLAN-r13, the base station may distinguish the measurement object for the cell of the MF from the measurement object for the cell of the WLAN by using the measurement report configuration IEs. i.e., the ReportConfigInterRAT or the MeasObjectEUTRA, so as to prevent the measurement object for the MF and the measurement object for the WLAN from being confused.

Specifically, in embodiments of determining to configure the UE to perform the measurement to the neighboring cell of the MF, the measurement configuration for the neighboring cell of the MF may be generated by using ways as follow: configuring measurement object frequency-band information (WLAN-BandIndicator-r13) included in the measurement object configuration IE of the WLAN as an operating frequency band of the neighboring cell of the MF needing to be measured by the UE, so as to indicate to the UE the operating frequency band of the neighboring cell of the MF needing to be measured by the UE: and configuring channel numbers (WLAN-Channel-r13) in carrier information included in the measurement object configuration IE of the WLAN according to the EARFCN (E-UTRAN Absolute Radio Frequency Channel Number) of the neighboring cell of the MF needing to be measured by the UE.

An operating frequency band of a MF cell is a 5 GHz frequency band at present, and may be expended to a 3.5 GHz frequency band or a 2.4 GHz frequency band in future Since the measurement object for the neighboring cell of the MF is configured by using the measurement object configuration IE (i.e. the MeasObjectWLAN-r13) of the WLAN in the present disclosure and a value range of the EARFCN of the neighboring cell of the MF is inconsistent with a value range (0-255) of WLAN channel numbers (WLAN-Channel-r13) in the measurement object configuration IE of the WLAN, the EARFCN of the neighboring cell of the MF to be measured by the UE needs to be converted to the WLAN channel numbers corresponding to the EARFCN when configuring the measurement object for the neighboring cell of the MF, and needs to be written into the carrier information of the measurement object configuration IE of the WLAN.

Specifically, the configuring the channel number in the carrier information included in the measurement object configuration IE of the WLAN according to the EARFCN of the neighboring cell of the MF needing to be measured by the UE, includes converting the EARFCN of the neighboring cell of the MF needing to be measured by the UE to the WLAN channel numbers corresponding to the EARFCN, according to a predetermined correspondence relation between the EARFCN of the MF and the WLAN channel numbers; and configuring the channel numbers in the carrier information included in the measurement object configuration IE of the WLAN as the converted WLAN channel numbers.

Optionally, two predetermined mapping modes may be used for the EARFCN in the operating band of the MF and the WLAN channel number, i.e., a united frequency-band mapping mode and an independent frequency-band mapping mode.

First Mode: The United Frequency-Band Mapping Mode

The EARFCNs in all operating frequency bands of the MF are mapped to the WLAN channel numbers unitedly, wherein each of the WLAN channel numbers only corresponds to the EARFCN in one of the operating frequency bands of the MF.

Therefore, a channel parameter list (channelNumbers-r13) in the measurement object configuration IE of the WLAN may instruct the UE to measure the EARFCNs in all operating frequency bands of the MF. If the base station indicates a plurality of operating frequency bands of the MF needing to be measured in the measurement object frequency-band information included in the measurement object configuration IE of the WLAN, only one channel parameter list (channelNumbers-r13) may be included, and the channel parameter list may indicate the EARFCNs in different operating frequency bands of the MF needing to be measured. Values of the EARFCNs usable in all operating frequency bands of the MF may be limited by a maximum one (255) of the WLAN channel number.

For example, a table 1 showing the predetermined correspondence relation between the EARFCNs of the operating frequency bands of the MF and the WLAN channel numbers is presented below. The base station configures the channel parameter list in the measurement object configuration IE of the WLAN according to the table 1.

TABLE 1

| Operating frequency bands of the MF | MF EARFCN | WLAN channel numbers |
|---|---|---|
| Band46 (a value range of the EARFCN: 46790-54539) | Band46-EARFCN-1 | 0 |
| | Band46-EARFCN-2 | 1 |
| | Band46-EARFCN-3 | 2 |
| | ... | |
| | Band46-EARFCN-m1 | m1-1 |
| Band42 (a value range of the ERARCN: 41590-43589) | Band42-EARFCN-1 | m1 |
| | Band42-EARFCN-2 | |
| | ... | |
| | Band42-EARFCN-m2 | m1 + m2-1 |
| ... | ... | ... |
| Band X | BandX-EARFCN-mx | n-1 |

Second Mode: Independent Frequency-Band Mapping Mode

Mapping relations between the EARFCN in each of the operating frequency bands of the neighboring cell of the MF and the WLAN channel numbers are configured to be independent from each other, and each of the WLAN channel numbers corresponds to the EARFCN in a plurality of operating frequency bands of the MF.

Therefore, the channel parameter list (channelNumbers-r13) in the measurement object configuration IE of the WLAN may only indicate the EARFCN in one operating frequency band. If the base station indicates, in the measurement object frequency-band information in the measurement object configuration IE of the WLAN, a plurality of operating frequency bands of the MF to be measured, different channel parameter lists (channelNumbers-r13) for different operating frequency bands of the MF may be included, and the channel parameter list for each of the operating frequency bands of the MF may indicate the EARFCN in the operating frequency band needing to be measured. Values of the EARFCN usable in each of the operating frequency bands of the MF may be limited by the maximum one (255) of the WLAN channel numbers. The channel parameter lists indicated in the measurement object configuration IE of the MF and the operating frequency bands of the MF may be in a sequential one-to-one correspondence, i.e., a first channel parameter list corresponds to a first operating frequency band of the MF, a second channel parameter list corresponds to a second operating frequency band of the MF, and so on.

For example, in case that the base station needs the UE to measure a cell in Band 46 or Band 42 in the MF, predetermined correspondence relation tables 2 and 3 between the EARFCN and the WLAN channel numbers in the Band 46 or the Band 42 as follow may be used.

TABLE 2

| EARFCN in Band46 in the MF | WLAN channel number |
|---|---|
| EARFCN-1 | 0 |
| EARFCN-2 | 1 |
| EARFCN-3 | 2 |
| EARFCN-4 | 3 |
| ... | ... |
| EARFCN-m1 | m1-1 |

TABLE 3

| EARFCN in Band N in the MF | WLAN channel number |
|---|---|
| EARFCN-1 | 0 |
| EARFCN-2 | 1 |
| EARFCN-3 | 2 |
| EARFCN-4 | 3 |
| ... | ... |
| EARFCN-m2 | m2-1 |

In some embodiments of the present disclosure, the base station may attach the above channel parameter lists in the measurement configuration and transmit the measurement configuration including the channel parameter lists to the UE. Optionally, the UE may be pre-configured with the channel parameter lists: and in such a case, the base station may not attach the above channel parameter lists in the measurement configuration.

In the above embodiments, in case that the base station configures the measurement report for the cell of the MF by using the measurement report configuration IE (i.e., ReportConfigEUTRA) of the E-UTRAN, a measurement report trigger type (triggerType) in the ReportConfigEUTRA is configured as an event-based trigger or as a periodic trigger, and a purpose of the periodic trigger is configured as reportStrongestCells.

Figure 3:
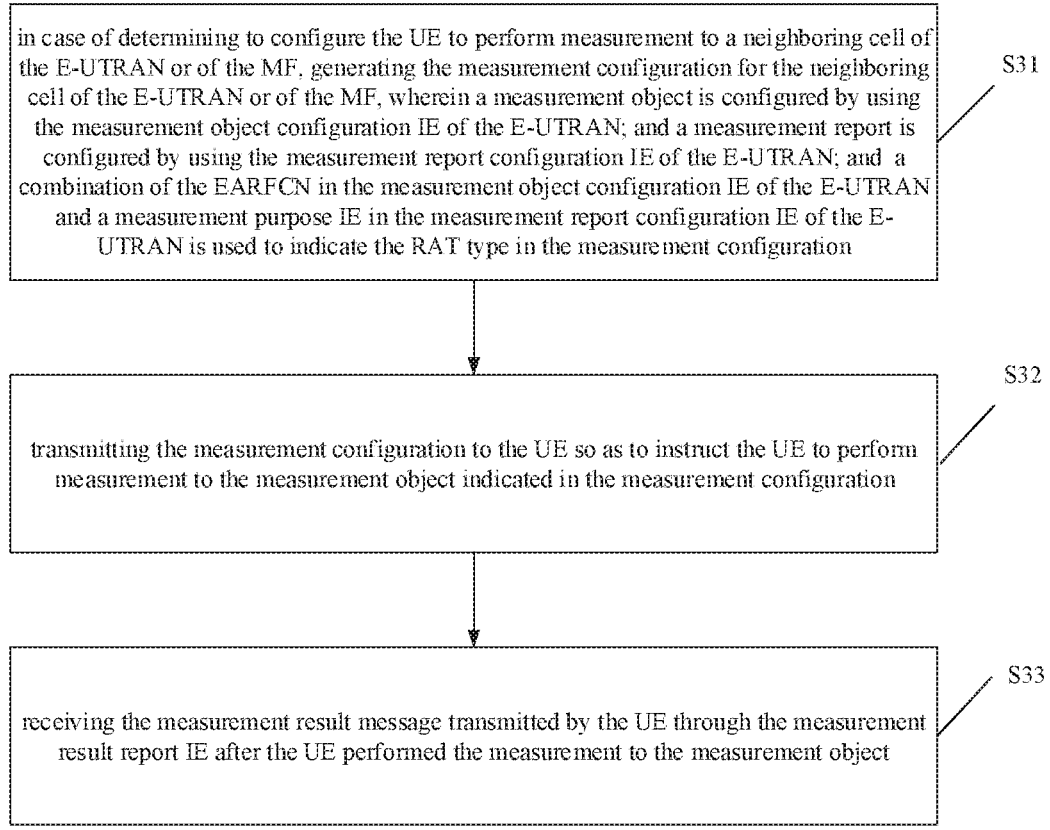
FIG. 3 is a flowchart of a method for distinguishing a measurement object according to some embodiments of the present disclosure.

Referring to FIG. 3, FIG. 3 is a flowchart of a method for distinguishing a measurement object according to some embodiments of the present disclosure. The method for distinguishing the measurement object is applied in the base station, and the method includes steps S31 to S33.

Step S31: in case of determining to configure the UE to perform measurement to a neighboring cell of the E-UTRAN or of the MF, generating the measurement configuration for the neighboring cell of the E-UTRAN or of the MF, wherein the measurement object configuration IE is the measurement object configuration IE of the E-UTRAN, and a measurement object may be configured by using the measurement object configuration IE of the E-UTRAN; and the measurement report configuration IE is the measurement report configuration IE of the E-UTRAN, and a measurement report may be configured by using the measurement report configuration IE of the E-UTRAN; and a combination of the measurement object configuration IE and the measurement report configuration IE being used to indicate the RAT type of the measurement configuration includes using a combination of the EARFCN in the measurement object configuration IE of the E-UTRAN and a measurement purpose IE in the measurement report configuration IE of the E-UTRAN to indicate the RAT type in the measurement configuration.

Step S32: transmitting the measurement configuration to the UE so as to instruct the UE to perform measurement to the measurement object indicated in the measurement configuration.

Step S33: receiving the measurement result message, the measurement result message being transmitted by the UE through the measurement result report IE after the UE performs the measurement to the measurement object.

Specifically, the measurement object configuration IE of the E-UTRAN is MeasObjectEUTRA, the measurement report configuration IE of the E-UTRAN is ReportConfigEUTRA.

Specifically, in case of determining to configure the UE to perform the measurement to the neighboring cell of the MF or of the E-UTRAN, generating the measurement configuration for the neighboring cell of the MF or of the E-UTRAN includes in case of determining to configure the UE to perform the measurement to the neighboring cell of the MF, configuring carrier frequency bins (CarrierFeq) in the MeasObjectEUTRA as the EARFCN of the neighboring cell of the MF needing to be measured by the UE, and configuring cellForWhichToReportCGI as a physicl cell identifier (PCI) of the neighboring cell of the MF needing to be measured by the UE, and configuring the measurement report trigger type (triggerType) in the ReportConfigEUTRA as the periodic trigger, and configuring the purpose of the periodic trigger as reportCGI; in case of determining to configure the UE to perform the measurement to the neighboring cell of the E-UTRAN, configuring the carrier frequency bins in the MeasObjectEUTRA as the EARFCN of the neighboring cell of the E-UTRAN needing to be measured by the UE, configuring the cellForWhichToReportCGI as the PCT of the neighboring cell of the E-UTRAN needing to be measured by the UE, configuring the measurement report trigger type in the ReportConfigEUTRA as the periodic trigger, and configuring the purpose of the periodic trigger as the reportCGI.

Since the EARFCN used in the E-UTRAN are different from those used in the MF and the LAA, the base station indicates whether the measurement configuration is for the E-UTRAN based on the EARFCN in the measurement object (MeasObjectEUTRA). However, the EARFCN in the measurement object (MeasObjectEUTRA) may not indicate whether the measurement configuration is for the measurement to the neighboring cell of the LAA or to the measurement to the neighboring cell of the MF.

CGI information of a cell of the MF is transmitted through a system broadcast of the cell, but no system broadcast is transmitted in a cell of the LAA. Thus, the UE cannot be configured to report the CGI information of the cell of the LAA. That is, only the purpose of the periodic trigger of the measurement report trigger type in the ReportConfiguEUTRA in the measurement configuration for the cell of the MF may be configured as the reportCGI. The base station may indicate to the UE that the measurement object (MeasObjectEUTRA) in the measurement configuration is for the measurement to the neighboring cell of the MF by configuring the purpose of the periodic trigger of the measurement report trigger type in the ReportConfigEUTRA as the CGI.

In the above embodiments, the combination of the measurement object configuration IE and the measurement report configuration IE is used to indicate the RAT type of the measurement configuration. In some other embodiments of the disclosure, the measurement object configuration IE may also be used to indicate the RAT type of the measurement configuration, examples of which are given below.

Figure 4:
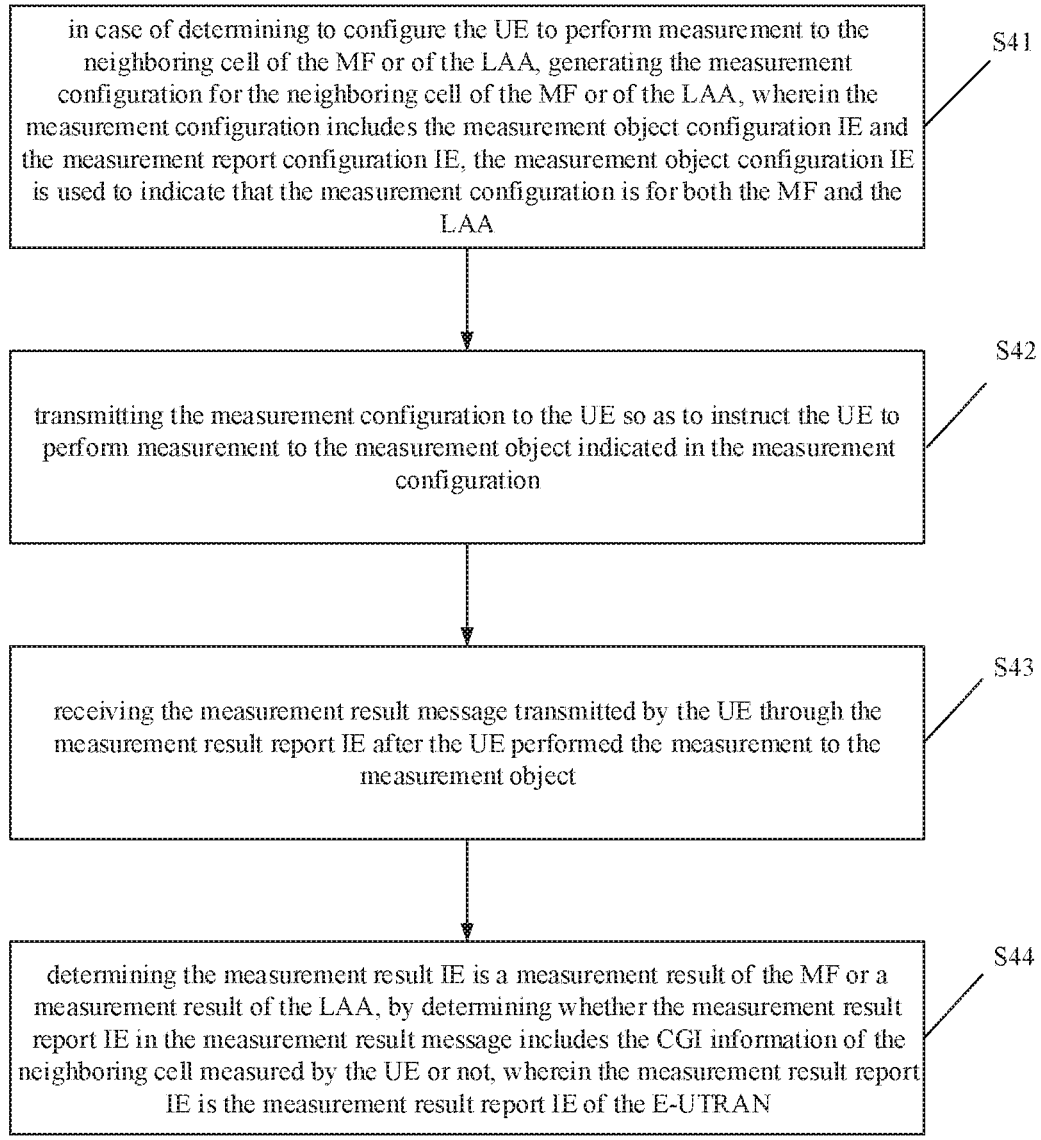
FIG. 4 is a flowchart of a method for distinguishing a measurement object according to some embodiments of the present disclosure.

Referring to FIG. 4, FIG. 4 is a flowchart of a method for distinguishing a measurement object according to some embodiments of the present disclosure. The method for distinguishing the measurement object is applied in the base station, and the method includes steps S41 to S43.

Step S41: in case of determining to configure the UE to perform measurement to the neighboring cell of the MF or of the LAA, generating the measurement configuration for the neighboring cell of the MF or of the LAA, wherein the measurement configuration includes the measurement object configuration IE and the measurement report configuration IE, wherein the measurement object configuration IE is used to indicate that the measurement configuration is for both the MF and the LAA.

Step S42: transmitting the measurement configuration to the UE so as to instruct the UE to perform measurement to the measurement object indicated in the measurement configuration.

Step S43: receiving the measurement result message, the measurement result message being transmitted by the UE through the measurement result report IE after the UE performs the measurement to the measurement object.

Specifically, in case that the base station determines to configure the UE to perform the measurement to the neighboring cell of the MF or the LAA, the base station transmits the measurement configuration for the neighboring cell of the MF or the LAA, and the base station uses the measurement object configuration IE of the E-UTRAN (i.e., the MeasObjectEUTRA) to configure the measurement object for the cell of the MF or of the LAA, and configures the carrier frequency (carrierFreq) in the MeasObjectEUTRA as the EARFCN of the MF or the LAA: and the base station uses the measurement report configuration IE of the E-UTRAN (i.e., the ReportConfigEUTRA) to configure the measurement report of the cell of the MF or of the LAA, i.e., the measurement object configuration IE of the E-UTRAN is used to indicate that the measurement configuration is the measurement configuration for both the MF and the LAA.

In some embodiments of the present disclosure, the base station does not distinguish the measurement object for the MF from the measurement object for the LAA when transmitting the measurement configuration. When the UE receives the measurement configuration, the UE may measure a channel quality of the neighboring cells of the MF and of the LAA at the EARFCN specified in the measurement object configuration IE of the E-UTRAN. In case that a neighboring cell measured by the UE is the neighboring cell of the MF and a measurement result satisfies a requirement, the UE reports the CGI information of the neighboring cell of the MF autonomously. In case that the neighboring cell measured by the UE is the neighboring cell of the LAA and a measurement result satisfies a requirement, the UE does not report the CGI information of the neighboring cell of the LAA. Thus, the base station may determine the RAT type of the neighboring cell measured by the UE is the MF or the LAA, by determining whether the measurement result message transmitted by the UE includes the CGI information of the neighboring cell measured by the UE or not.

Accordingly, in case that the base station configures the UE to perform the measurement to the neighboring cell of the MF or the LAA, after the receiving the measurement result message transmitted by the UE through the measurement result report IE after the UE performs the measurement to the measurement object indicated in the measurement configuration, the method further includes a step S44.

Step S44: determining a measurement result report IE is a measurement result of the MF or a measurement result of the LAA, by determining whether the measurement result report IE in the measurement result message includes the CGI information of the neighboring cell measured by the UE or not, wherein the measurement result report IE is the measurement result report IE of the E-UTRAN.

The determining the measurement result report IE is the measurement result of the MF or the measurement result of the LAA by determining whether the measurement result report IE in the measurement result message includes the CGI information of the neighboring cell measured by the UE or not, includes: determining whether the measurement result report IE in the measurement result message includes the CGI information of the neighboring cell measured by the UE or not, wherein in case that the measurement result report IE includes the CGI information of the neighboring cell measured by the UE, determining that the measurement result report IE is the measurement result of the MF, and in case that the measurement result report IE does not include the CGI information of the neighboring cell measured by the UE, determining that the measurement result report IE is the measurement result of the LAA.

In the above embodiments, after the receiving the measurement result message transmitted by the UE through the measurement result report IE after the UE performs the measurement to the measurement object, the method further includes: obtaining, from the measurement result report IE in the measurement result message, a channel quality measurement result of the neighboring cell indicated in the measurement configuration after the UE performs measurement to the channel quality.

Specifically, the channel quality measurement result of the neighboring cell of the E-UTRAN, the neighboring cell of the LAA, or the neighboring cell of the MF made by the UE may be obtained from the measurement result report IE (MeasResultEUTRA) of the E-UTRAN in the measurement result message, or the channel quality measurement result of the cell of the WLAN made by the UE may be obtained from the measurement result report IE (measResultListWLAN-r13) of the WLAN in the measurement result message.

The base station may add or remove a SCell of the LAA, offload a LTE traffic to the WLAN-based network, or hand over the UE from the LTE-based network to the MF-based network, according to channel quality measurement results in different RATs made by the UE.

Figure 5:
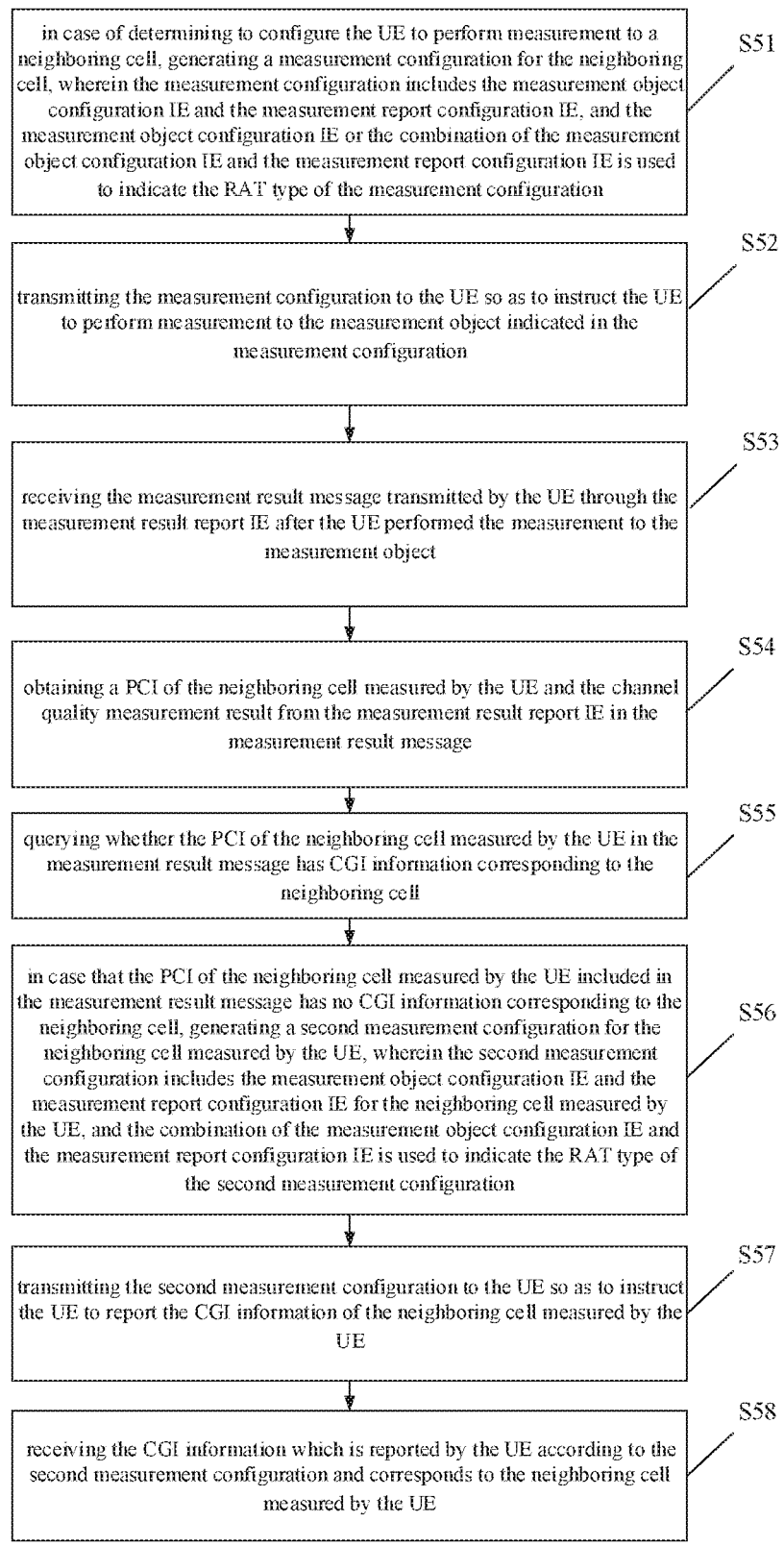
FIG. 5 is a flowchart of a method for distinguishing a measurement object according to some embodiments of the present disclosure.

Referring to FIG. 5. FIG. 5 is a flowchart of a method for distinguishing a measurement object according to some embodiments of the present disclosure. The method for distinguishing a measurement object is applied in the base station, and the method includes steps S51 to S58.

Step S51: in case of determining to configure the UE to perform measurement to a neighboring cell, generating a measurement configuration for the neighboring cell, wherein the measurement configuration includes the measurement object configuration IE and the measurement report configuration IE, and the measurement object configuration IE or the combination of the measurement object configuration IE and the measurement report configuration IE is used to indicate the RAT type of the measurement configuration.

Step S52: transmitting the measurement configuration to the UE so as to instruct the UE to perform measurement to the measurement object indicated in the measurement configuration.

Step S53: receiving the measurement result message, the measurement result message being transmitted by the UE through the measurement result report IE after the UE performs the measurement to the measurement object.

Step S54: obtaining a Physical Cell Identifier (PCI) of the neighboring cell measured by the UE and the channel quality measurement result from the measurement result report IE in the measurement result message.

Step S55: querying whether the PCI of the neighboring cell measured by the UE has Cell Global Identifier (CGI) information corresponding to the neighboring cell.

Step S56: in case that the PCI of the neighboring cell measured by the UE included in the measurement result message has no CGI information corresponding to the neighboring cell, generating a second measurement configuration for the neighboring cell measured by the UE, wherein the second measurement configuration includes the measurement object configuration IE and the measurement report configuration IE for the neighboring cell measured by the UE, and the combination of the measurement object configuration IE and the measurement report configuration IE is used to indicate the RAT type of the second measurement configuration.

Step S57: transmitting the second measurement configuration to the UE so as to instruct the UE to report the CGI information of the neighboring cell measured by the UE.

Step S58: receiving the CGI information which is reported by the UE according to the second measurement configuration and corresponds to the neighboring cell measured by the UE.

The base station may determine whether to hand over the UE to the neighboring cell or to perform an autonomous neighboring-cell configuration process, according to the CGI information of the neighboring cell reported by the UE.

For example, the base station of the MF queries whether the PCI of the cell of the MF in the measurement result transmitted by the UE has the CGI information corresponding to the PCI: if no CGI information corresponding to the PCI exists, the base station transmits the measurement configuration for the cell of the MF having the PCI, so as to instruct the UE to report the CGI information of the cell of the MF.

In such a case, the generating the second measurement configuration for the neighboring cell measured by the UE, includes in case that the neighboring cell measured by the UE is the neighboring cell of the MF or the neighboring cell of the E-UTRAN, generating the second measurement configuration for the neighboring cell of the MF or the neighboring cell of the E-UTRAN, wherein the measurement object configuration IE in the second measurement configuration is the measurement object configuration IE of the E-UTRAN, and the measurement object is configured by using the measurement object configuration IE of the E-UTRAN: the measurement report configuration IE in the second measurement configuration is the measurement report configuration IE of the E-UTRAN, and the measurement report configuration IE is configured by using the measurement report configuration IE of the E-UTRAN; the measurement result report IE is the measurement result report IE of the E-UTRAN, receiving, through the measurement result report IE of the E-UTRAN, the measurement result transmitted by the UE.

The combination of the measurement object configuration IE and the measurement report configuration IE being used to indicate the RAT type of the second measurement configuration, includes: using the combination of the EARFCN in the measurement object configuration IE of the E-UTRAN and a measurement purpose IE in the measurement report configuration IE of the E-UTRAN to indicate the RAT type of the second measurement configuration.

The receiving the CGI information which is reported by the UE according to the second measurement configuration and corresponds to the neighboring cell measured by the UE, includes: receiving, through the measurement result report IE of the E-UTRAN, the CGI information which is reported by the UE according to the second measurement configuration and corresponds to the neighboring cell measured by the UE.

In some other embodiments of the present disclosure, the generating the second measurement configuration for the neighboring cell measured by the UE, includes: in case that the neighboring cell measured by the UE is the neighboring cell of the MF, generating the second measurement configuration for the neighboring cell of the MF, wherein the measurement object configuration IE in the second measurement configuration is the measurement object configuration IE of the WLAN, and the measurement object of the neighboring cell of the MF is configured by using the measurement object configuration IE of the WLAN; the measurement report configuration IE in the second measurement configuration is the measurement report configuration IE of the E-UTRAN, and the measurement report of the neighboring cell of the MF is configured by using the measurement report configuration IE of the E-UTRAN. The measurement result report IE is the measurement result report IE of the E-UTRAN, and the measurement result of the neighboring cell of the MF transmitted by the UE is received through the measurement result report IE of the E-UTRAN.

The combination of the measurement object configuration IE and the measurement report configuration IE being used to indicate the RAT type of the second measurement configuration, includes: using the combination of the measurement object configuration IE of the WLAN and the measurement report configuration IE of the E-UTRAN to indicate that the RAT type of the second measurement configuration is the MF.

The receiving the CGI information which is reported by the UE according to the second measurement configuration and corresponds to the neighboring cell measured by the UE, includes: receiving, through the measurement result report IE of the E-UTRAN, the CGI information which is reported by the UE according to the second measurement configuration and corresponds to the neighboring cell measured by the UE.

The above embodiments of the present disclosure provide the method for distinguishing the measurement object, and a problem in the related art that the measurement object in the neighboring cell of the LAA cannot be distinguished from the measurement object in the neighboring cell of the MF may be solved. Thus, the base station may indicate to the UE that the measurement object at channel frequency bins in the Band 46 is the measurement object for the LAA or the measurement object for the MF. Thus, the present disclosure may support the UE to handover from the LTE-based network to the MF-based network without changing a relevant 3GPP standard.

The above embodiments of the present disclosure are described in respect of the method for distinguishing the measurement object performed at a base station side. The method for distinguishing the measurement object performed at a UE side will be described hereinafter.

Figure 6:
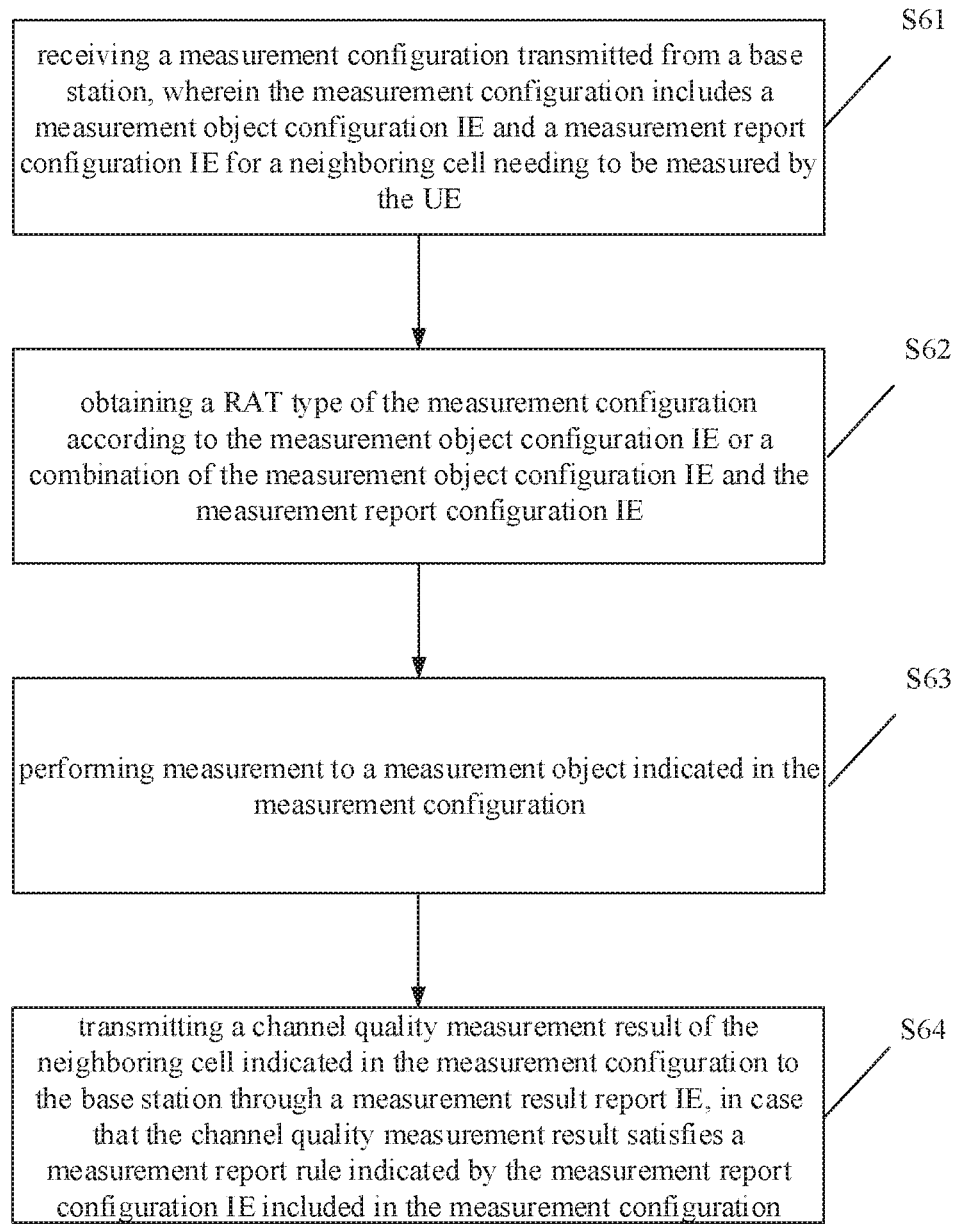
FIG. 6 is a flowchart of a method for distinguishing a measurement object according to some embodiments of the present disclosure.

Referring to FIG. 6. FIG. 6 is a flowchart of a method for distinguishing a measurement object according to some embodiments of the present disclosure. The method for distinguishing the measurement object is applied in a User Equipment (UE), and the method includes steps S61 to S64.

Step S61: receiving a measurement configuration transmitted from a base station, wherein the measurement configuration includes a measurement object configuration IE and a measurement report configuration IE for a neighboring cell needing to be measured by the UE.

Step S62: obtaining a RAT type of the measurement configuration according to the measurement object configuration IE or a combination of the measurement object configuration IE and the measurement report configuration IE.

Step S63: performing measurement to a measurement object indicated in the measurement configuration.

Step S64: transmitting a channel quality measurement result of the neighboring cell indicated in the measurement configuration to the base station through a measurement result report IE, in case that the channel quality measurement result satisfies a measurement report rule indicated by the measurement report configuration IE included in the measurement configuration.

In some embodiments of the present disclosure, the RAT type of the neighboring cell needing to be measured by the UE is obtained by the UE through the measurement object configuration IE or the combination of the measurement object configuration IE and the measurement report configuration IE in the measurement configuration, so that the measurement object indicated in the measurement configuration may be measured according to the RAT type.

In a specific example of the present disclosure, following three modes may be used by the UE to obtain the RAT type of the measurement configuration.

First mode: in case that the measurement object configuration IE in the measurement configuration received by the UE is the measurement object configuration IE of the WLAN, and the measurement report configuration IE is the measurement report configuration IE of the E-UTRAN, it may be determined that the measurement configuration is for the measurement to the neighboring cell of the MF. Specifically, the measurement object configuration IE of the WLAN is MeasObjectWLAN-r13, and the measurement report configuration IE of the E-UTRAN is the ReportConfigEUTRA.

In case that the UE determines that the measurement configuration is for the measurement to the neighboring cell of the MF, the UE may obtain a MF measurement object in the measurement configuration and perform the channel quality measurement to the MF measurement object. The MF measurement object includes the EARFCN in the MF.

Second mode: in case that the measurement object configuration IE in the measurement configuration received by the UE is the measurement object configuration IE of the E-UTRAN, and the measurement report configuration IE is the measurement report configuration IE of the E-UTRAN, it may be determined that the measurement configuration is for the measurement to the neighboring cell of the LAA or the neighboring cell of the E-UTRAN. Specifically, the measurement object configuration IE of the E-UTRAN is MeasObjectEUTRA, and the measurement report configuration IE of the E-UTRAN is ReportConfigEUTRA.

In case that the UE determines that the measurement configuration is for the measurement to the neighboring cell of the E-UTRAN or the neighboring cell of the LAA, the UE may obtain a E-UTRAN measurement object or a LAA measurement object in the measurement configuration and perform the channel quality measurement to the E-UTRAN measurement object or the LAA measurement object. The E-UTRAN measurement object or the LAA measurement object includes the EARFCN of the E-UTRAN or the EARFACN of the LAA, a target cell identifier, and the like.

Third mode: in case that the measurement object configuration IE in the measurement configuration received by the UE is the measurement object configuration IE of the WLAN, and the measurement report configuration IE is the measurement report configuration IE of the inter-RAT, it may be determined that the measurement configuration is for the measurement to the neighboring cell of the WLAN. Specifically, the measurement object configuration IE of the WLAN is MeasObjectWLAN-r13, the measurement report configuration IE of the inter-RAT is ReportConfigInterRAT.

In case that the UE determines that the measurement configuration is for the measurement to the neighboring cell of the WLAN, the UE may obtain the WLAN measurement object in the measurement configuration and perform the channel quality measurement to the WLAN measurement object. The WLAN measurement object includes operating frequency bands of the WLAN, channel numbers, a WLAN cell identifier, and the like.

In the embodiments in which the neighboring cell needing to be measured by the UE is the neighboring cell of the ME the performing measurement to the measurement object indicated in the measurement configuration includes obtaining the operating frequency band of the neighboring cell of the MF needing to be measured by the UE, according to the measurement object frequency-band information included in the measurement object configuration IE of the WLAN; obtaining the channel numbers in the carrier information included in the measurement object configuration IE of the WLAN; obtaining the EARFCN of the neighboring cell of the MF needing to be measured by the UE, according to the operating frequency band and the channel numbers; and measuring the channel quality of the neighboring cell of the MF according to the EARFCN.

Since the measurement object configuration IE (i.e., MeasObjectWLAN-r13) of the WLAN is used in the embodiments of the present disclosure to configure the measurement object for the neighboring cell of the ME the channel numbers in the carrier information included in the measurement object configuration IE of the WLAN are the WLAN channel numbers, and when the UE obtains a MF measurement object in the measurement configuration, the UE needs to convert the WLAN channel numbers to the EARFCN of the neighboring cell of the MF.

Optionally, the obtaining the channel numbers in the carrier information included in the measurement object configuration IE of the WLAN, and obtaining the EARFCN of the neighboring cell of the MF needing to be measured by the UE according to the channel numbers includes: converting the WLAN channel numbers in the carrier information included in the measurement object configuration IE of the WLAN to the EARFCN of the MF according to the predetermined correspondence relation between the EARFCN of the MF and the WLAN channel numbers, so as to obtain the EARFCN of the neighboring cell of the MF needing to be measured by the UE.

According to different predetermined correspondence relations between the EARFCNs of the MF and the WLAN channel numbers, two different ways may be used by the UE to obtain the EARFCN of the neighboring cell of the ME i.e. through the united frequency-band mapping mode and the independent frequency-band mapping mode.

First Way: Obtaining Through the United Frequency-Band Mapping Mode.

In the united frequency-band mapping mode, the EARFCN in all operating frequency bands of the MF are mapped unitedly to the WLAN channel numbers, wherein each of the WLAN channel numbers only corresponds to the EARFCN in one of the operating frequency bands of the MF.

The channel parameter list (channelNumbers-r13) in the measurement object configuration IE of the WLAN may indicate all operating frequency bands of the MF and the EARFCN in the frequency bands. The UE may obtain the EARFCN in different frequency bands needing to be measured, through the channel parameter list.

For example, the UE may obtain the EARFCN of the MF corresponding to the WLAN channel numbers included in the channel parameter list in the measurement object configuration IE (MeasObjectWLAN-r13) of the WLAN, according to the Table 1 above.

Second Mode: Obtaining Through the Independent Frequency-Band Mapping Mode

In the independent frequency-band mapping mode, mapping relations between the EARFCN in each of the operating frequency bands in the MF and the WLAN channel numbers are independent from each other, and each of the WLAN channel numbers corresponds to the EARFCNs in a plurality of operating bands of the MF.

Therefore, the channel parameter list (channelNumbers-r13) in the measurement object configuration IE (MeasObjectWLAN-r13) of the WLAN may only indicate the EARFCN in one operating band. Different channel parameter lists (channelNumbers-r13) for different operating frequency bands of the MF may be included in the measurement object configuration IE. The UE may obtain the EARFCN in each of the operating frequency bands of the MF needing to be measured, through the channel parameter list corresponding to the operating frequency band.

For example, the UE may obtain the EARFCNs in the Band 46 or the Band 42 needing to be measured, through the predetermined correspondence relation table between the EARFCNs in the Band 46 or the Band 42 and the WLAN channel numbers in the Table 2 or the Table 3.

Figure 7:
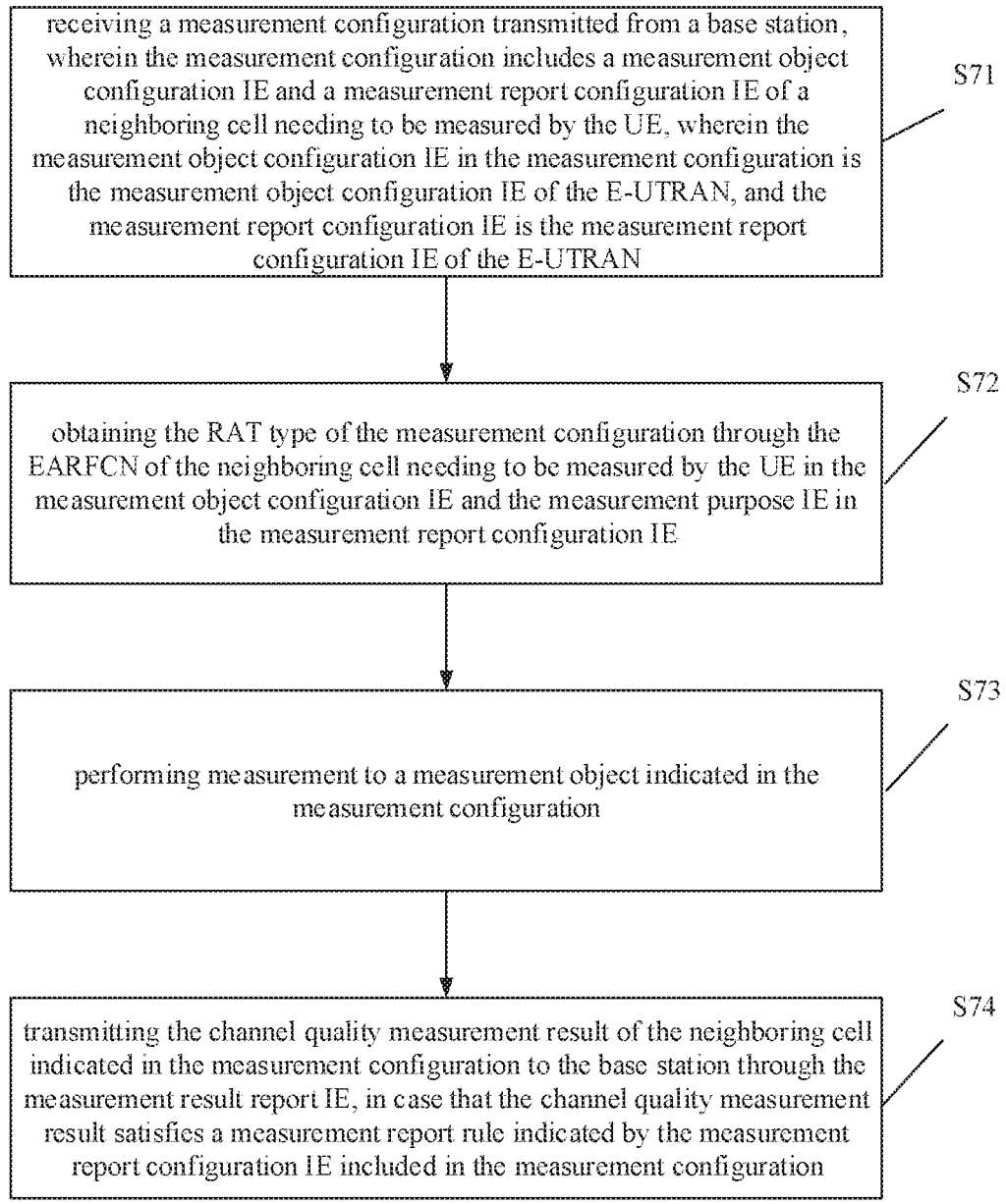
FIG. 7 is a flowchart of a method for distinguishing a measurement object according to some embodiments of the present disclosure.

Referring to FIG. 7, FIG. 7 is a flowchart of a method for distinguishing a measurement object according to some embodiments of the present disclosure. The method for distinguishing the measurement object is applied in the UE, and the method includes steps S71 to S74.

Step S71: receiving a measurement configuration transmitted from a base station, wherein the measurement configuration includes a measurement object configuration IE and a measurement report configuration IE of a neighboring cell needing to be measured by the UE, wherein the measurement object configuration IE in the measurement configuration is the measurement object configuration IE of the E-UTRAN, and the measurement report configuration IE is the measurement report configuration IE of the E-UTRAN.

Step S72: obtaining the RAT type of the measurement configuration through the EARFCN of the neighboring cell needing to be measured by the UE in the measurement object configuration IE and the measurement purpose IE in the measurement report configuration IE.

Step S73: performing measurement to a measurement object indicated in the measurement configuration.

Step S74: transmitting the channel quality measurement result of the neighboring cell indicated in the measurement configuration to the base station through the measurement result report IE, in case that the channel quality measurement result satisfies a measurement report rule indicated by the measurement report configuration IE included in the measurement configuration.

The method for distinguishing the measurement object provided in the present disclosure will be described by an example that the neighboring cell measured by the UE is the neighboring cell of the MF or of the E-UTRAN.

The obtaining the RAT type of the measurement configuration through the EARFCN of the neighboring cell needing to be measured by the UE in the measurement object configuration IE and through the measurement purpose IE in the measurement report configuration IE, includes: in case that the measurement report trigger type in the measurement purpose IE in the measurement report configuration IE of the E-UTRAN is configured as the periodic trigger, a purpose of the periodic trigger is configured as the reportCGI, and the carrier frequency bins in the measurement object configuration IE of the E-UTRAN is the EARFCN of the MF, determining the RAT type of the measurement configuration is the MF: and, in case that the measurement report trigger type in the measurement purpose IE in the measurement report configuration IE of the E-UTRAN is configured as the periodic trigger, the purpose of the periodic trigger is configured as the reportCGI, and the carrier frequency bins in the measurement object configuration IE of the E-UTRAN are the EARFCN of the E-UTRAN, determining the RAT type of the measurement configuration is the E-UTRAN.

In case that the RAT type of the measurement configuration is determined as the MF, the UE obtains the PCI of the neighboring cell of the MF of which the CGI information needs to be reported, from the measurement object configuration IE (MeasObjectEUTRA) in the measurement configuration: the UE reads the CGI information in a system broadcast of the neighboring cell of the MF having the PCI; and the UE transmits the read CGI information to the base station through the measurement result report IE (MeasResultEUTRA) in the measurement result message (MeasResults). The CGI information of a cell may include an ECGI (an E-UTRAN Cell Global Identifier) and a TAC (Tracking Area Code), and may further include PLMN (Public Land Mobile Network) information.

Figure 8:
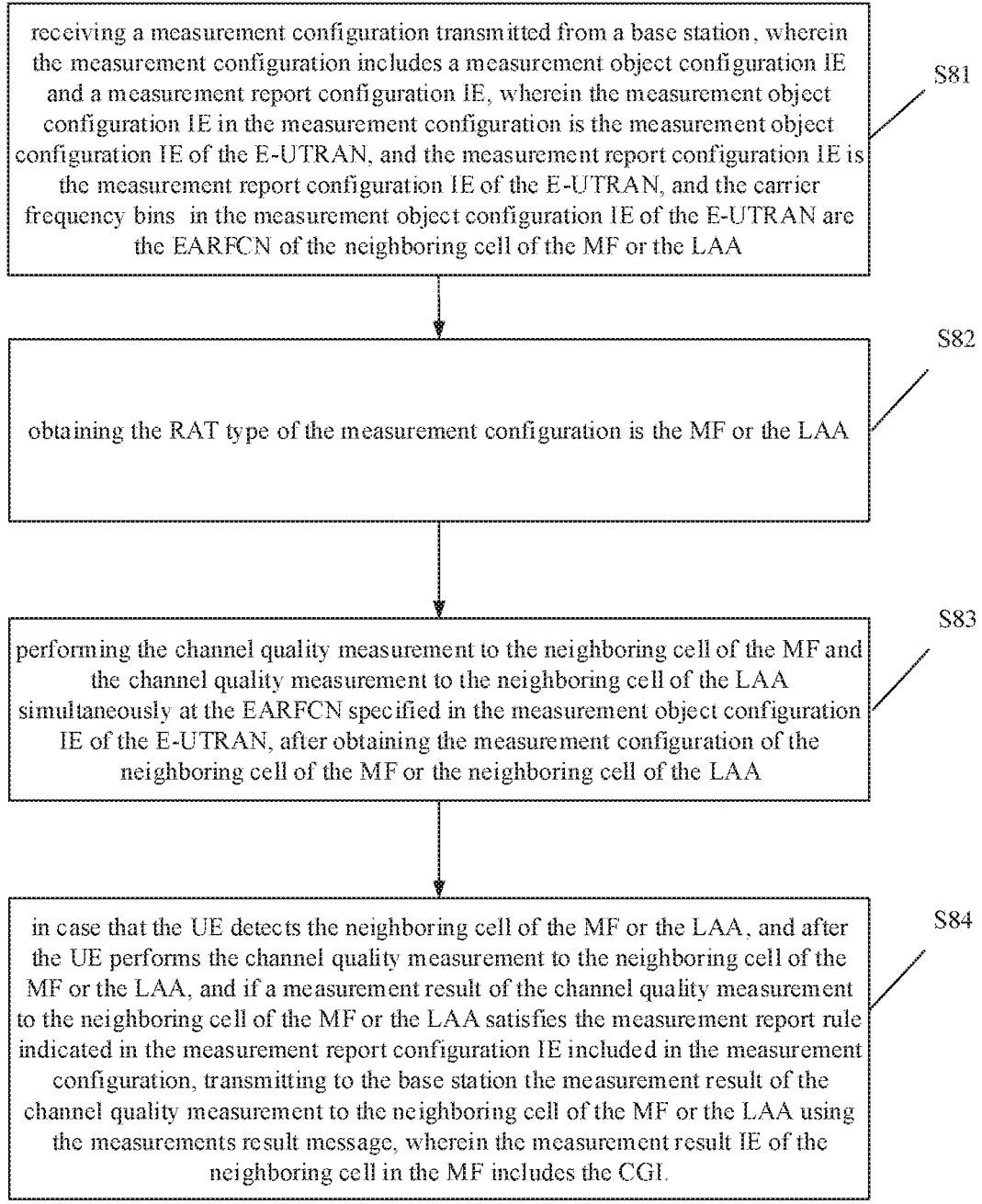
FIG. 8 is a flowchart of a method for distinguishing a measurement object according to some embodiments of the present disclosure.
Figure 9A:
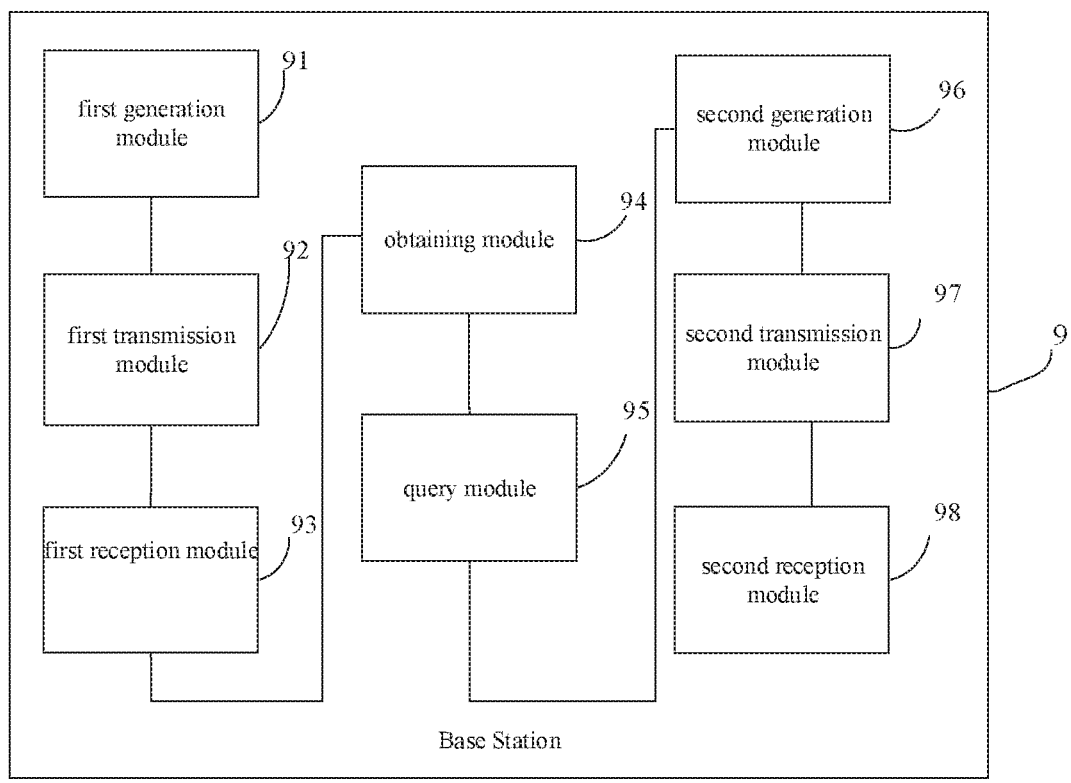
FIG. 9A is a structural schematic diagram of a base station according to some embodiments of the present disclosure.
Figure 9B:
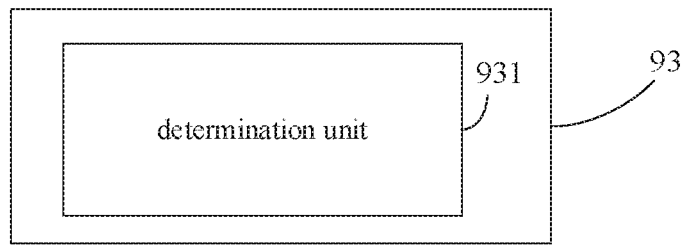
FIG. 9B to 9G are specific structural schematic diagrams of modules in the base station according to some embodiments of the present disclosure.
Figure 9C:
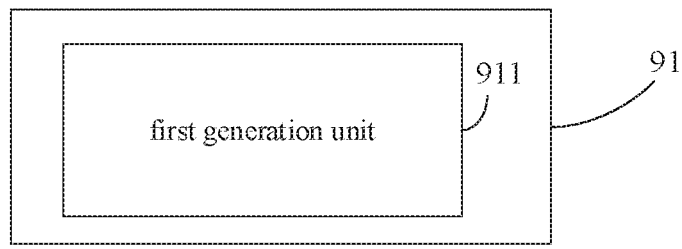
Figure 9D:
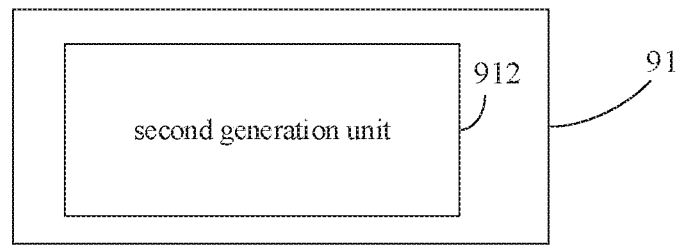
Figure 9E:
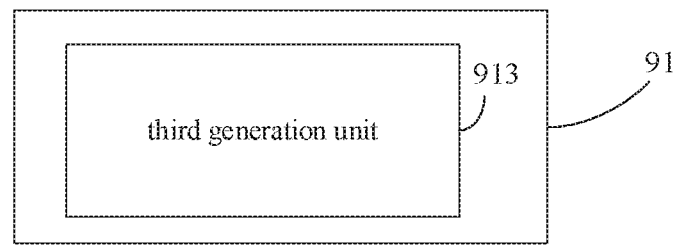
Figure 9F:
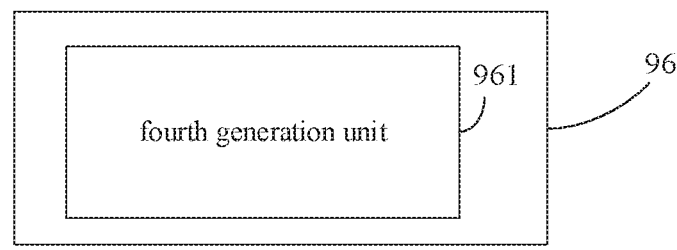
Figure 9G:
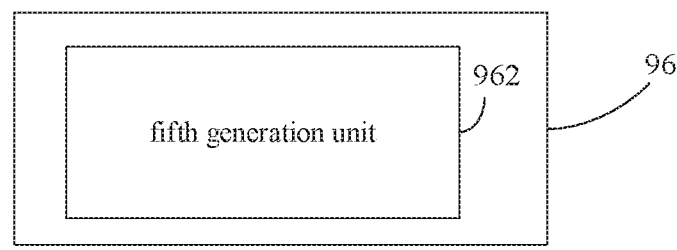

Referring to FIG. 8, FIG. 8 is a flowchart of a method for distinguishing a measurement object according to some embodiments of the present disclosure. The method for distinguishing the measurement object is applied in the UE, and the method includes steps S81 to S84.

Step S81: receiving a measurement configuration transmitted from a base station, wherein the measurement configuration includes a measurement object configuration IE and a measurement report configuration IE of a neighboring cell needing to be measured by the UE, wherein the measurement object configuration IE in the measurement configuration is the measurement object configuration IE of the E-UTRAN, and the measurement report configuration IE is the measurement report configuration IE of the E-UTRAN, and the carrier frequency bins (carrierFreq) in the measurement object configuration IE of the E-UTRAN are the EARFCN of the neighboring cell of the MF or the neighboring cell of the LAA.

Step S82: obtaining the RAT type of the measurement configuration is the MF or the LAA. In such a case, the UE cannot distinguish the measurement object for the MF from the measurement object for the LAA.

Step S83: performing the channel quality measurement to the neighboring cell of the MF and the channel quality measurement to the neighboring cell of the LAA simultaneously at the EARFCN specified in the measurement object configuration IE of the E-UTRAN, after obtaining the measurement configuration of the neighboring cell of the MF or the neighboring cell of the LAA.

Step S84: in case that the UE detects the neighboring cell of the MF or the neighboring cell of the LAA at the EARFCN, after the UE performs the channel quality measurement to the neighboring cell of the MF or the channel quality measurement to the neighboring cell of the LAA, and if a measurement result of the channel quality measurement to the neighboring cell of the MF or a measurement result of the channel quality measurement to the neighboring cell of the LAA satisfies the measurement report rule indicated in the measurement report configuration IE included in the measurement configuration, transmitting to the base station the measurement results (including the Reference Signal Receiving Power (RSRP) or the Reference Signal Receiving Quality (RSRQ)) of the channel quality measurements to the neighboring cell of the MF or the neighboring cell of the LAA using the measurement result report IE (MeasResultEUTRA) of the E-UTRAN in the measurement result message (MeasResults), wherein a measurement identifier (measID) in the measurement result message corresponds to the measurement identifier (measID) included in the measurement configuration for the MF.

In case that the UE detects the neighboring cell of the MF at the specified EARFCN, and the measurement result of the measurement to the detected neighboring cell of the MF satisfies the measurement report rule indicated in the measurement report configuration IE included in the measurement configuration, the UE reads a system broadcast message of the detected neighboring cell of the MF, obtains the CGI information of the detected neighboring cell of the MF, incorporates the CGI information in the measurement result report IE (MeasResultEUTRA) of the detected neighboring cell of the MF, and transmits the measurement result report IE (MeasResultEUTRA) to the base station, so that the base station may determine whether the measurement result report IE is a measurement result report IE of the neighboring cell of the MF or a measurement result report IE of the neighboring cell of the LAA by judging whether the measurement result report IE includes the CGI information or not. The CGI information of a cell may include the ECGI, the TAC, and may further include the PLMN information.

In the above embodiments, after the UE performs the channel quality measurement to the measurement object (the EARFCN of the WLAN, the E-UTRAN of the LAA or the MF) indicated in measurement configuration, in case that the channel quality measurement result of the measurement object indicated in the measurement configuration satisfies the measurement report rule indicated by the measurement report configuration IE included in the measurement configuration, the UE transmits the channel quality measurement result to the base station.

Specifically, in case that the RAT type of the measurement object indicated in the measurement configuration is the E-UTRAN, the LAA or the MF, the channel quality measurement result (including the RSRP or the RSRQ) of the E-UTRAN, the LAA or the MF is transmitted to the base station using the measurement result report IE (MeasResultEUTRA) of the E-UTRAN in the measurement result message: and in case that the RAT type of the measurement object indicated in the measurement configuration is the WLAN, the channel quality measurement result of the WLAN is transmitted to the base station using the measurement result report IE of the WLAN in the measurement result message. The measurement identifier (measID) in the measurement result message corresponds to the measurement identifier (measID) included in the measurement configuration for the MF.

In some embodiments of the present application, each measurement result report IE (MeasResultEUTRA) of the E-UTRAN includes a measurement result of one cell, and one measurement result message at most includes measurement results of eight cells.

In the embodiments of the present disclosure, optionally, the measurement results of the neighboring cell of the MF and the neighboring cell of the LAA are incorporated in different measurement result report IEs of the E-UTRAN in one measurement result message to be sent to the base station or incorporated in different measurement result messages to be sent to the base station.

Optionally, in case that the measurement configuration indicates measurement to a plurality of EARFCNs in the MF, the measurement result message indicates the EARFCNs in the MF being measured, or each measurement result report IE in the measurement result message indicates a EARFCN in the MF being measured.

In case that the measurement configuration indicates measurement to one EARFCN in the MF, the measurement result message may not indicate the EARFCN in the MF being measured. Optionally, in some other embodiments of the present disclosure, in case that the measurement configuration indicates measurement to one neighboring cell of the MF, the measurement result message may indicate the EARFCN in the MF being measured.

Based on a same inventive concept, referring to FIG. 9A-9G, some embodiments of the present disclosure further provide a base station 9. The base station 9 includes a first generation module 91, a first transmission module 92, and a first reception module 93.

The first generation module 91 is configured to, in case of determining to configure the UE to perform measurement to a neighboring cell, generate a measurement configuration for the neighboring cell, wherein the measurement configuration includes the measurement object configuration information element (IE) and the measurement report configuration IE, and the measurement object configuration IE or a combination of the measurement object configuration IE and the measurement report configuration IE is used to indicate the RAT type of the measurement configuration.

The first transmission module 92 is configured to transmit the measurement configuration to the UE so as to instruct the UE to perform measurement to the measurement object indicated in the measurement configuration.

The first reception module 93 is configured to receive the measurement result message transmitted by the UE through the measurement result report IE after the UE performs the measurement to the measurement object.

In some embodiments of the present disclosure, the first generation module 91 includes a first generation unit 911. The first generation unit 911 is configured to, in case of determining to configure the UE to perform measurement to the neighboring cell of the MF, generate the measurement configuration for the neighboring cell of the MF, wherein the measurement object configuration IE is a measurement object configuration IE of the WLAN, the measurement object of the neighboring cell of the MF is configured by using the measurement object configuration IE of the WLAN: the measurement report configuration IE is the measurement report configuration IE of the E-UTRAN, and the measurement report of the neighboring cell of the MF is configured by using the measurement report configuration IE of the E-UTRAN, and a combination of the measurement object configuration IE of the WLAN and the measurement report configuration IE of the E-UTRAN is used to indicate that the RAT type of the measurement configuration is the MF.

The first reception module 93 is specifically configured to: in case of configuring the UE to perform the measurement to the neighboring cell of the MF, receive the measurement result message transmitted by the UE through the measurement result report IE of the E-UTRAN after the UE performs the measurement to the measurement object.

Specifically, the measurement object configuration IE of the WLAN is MeasObjectWLAN-r13, the measurement report configuration IE of the E-UTRAN is ReportConfigEUTRA, and the measurement result report IE of the E-UTRAN is the MeasResultEUTRA.

Optionally, the first generation unit 911 is specifically configured to: configure measurement object frequency-band information included in the measurement object configuration IE of the WLAN as an operating frequency band of the neighboring cell of the MF needing to be measured by the UE: and configure channel numbers in carrier information included in the measurement object configuration IE of the WLAN according to the EARFCN of the neighboring cell of the MF needing to be measured by the UE.

Optionally; the first generation unit 911 is specifically configured to convert the EARFCN of the neighboring cell of the MF needing to be measured by the UE to WLAN channel numbers corresponding to the EARFCN according to a predetermined correspondence relation between the EARFCN of the MF and the WLAN channel numbers; and configure the channel numbers in the carrier information included in the measurement object configuration IE of the WLAN as the converted WLAN channel numbers.

In the first mapping mode and in the predetermined correspondence relation, the EARFCNs in all operating frequency bands of the MF are mapped unitedly to the WLAN channel numbers, wherein each of the WLAN channel numbers only corresponds to the EARFCN in one of the operating frequency bands of the MF.

Optionally, the predetermined correspondence relation is stored in a channel parameter list.

In a second mapping mode and in the predetermined correspondence relation, mapping relations between the EARFCN in each of the operating frequency bands of the neighboring cell of the MF and the WLAN channel numbers are independent from each other, and each of the WLAN channel numbers corresponds to the EARFCNs in multiple ones of all operating frequency bands of the MF.

Optionally, the predetermined correspondence relation corresponding to different operating frequency bands of the neighboring cell of the MF is stored in different channel parameter lists.

In some embodiments of the present disclosure, the first generation module 91 includes a second generation unit 912. The second generation unit 912 is configured to: in case of determining to configure the UE to perform measurement to the neighboring cell of the E-UTRAN or the MF, generate the measurement configuration for the neighboring cell of the E-UTRAN or the MF, wherein the measurement object configuration IE is the measurement object configuration IE of the E-UTRAN, the measurement object is configured by using the measurement object configuration IE of the E-UTRAN; the measurement report configuration IE is the measurement report configuration IE of the E-UTRAN, and the measurement report configuration IE is configured by using the measurement report configuration IE of the E-UTRAN.

The combination of the measurement object configuration IE and the measurement report configuration IE being used to indicate the RAT type of the measurement configuration, includes: using the combination of the EARFCN in the measurement object configuration IE of the E-UTRAN and the measurement purpose IE in the measurement report configuration IE of the E-UTRAN to indicate the RAT type of the measurement configuration.

Specifically, the measurement object configuration IE of the E-UTRAN is MeasObjectEUTRA, and the measurement report configuration IE of the E-UTRAN is ReportConfigEUTRA.

Optionally, the second generation unit 912 is specifically configured to: in case of determining to configure the UE to perform the measurement to the neighboring cell of the MF, configure carrier frequency bins in the MeasObjectEUTRA as the EARFCN of the neighboring cell of the MF needing to be meaured by the UE, configure a cellForWhichToReportCGI as a physical cell identifier (PCI) of the neighboring cell of the MF needing to be measured by the UE, configure the measurement report trigger type in the ReportConfigEUTRA as the periodic trigger, and configure the purpose of the periodic trigger as the reportCGI; and in case of determining to configure the UE to perform the measurement to the neighboring cell of the E-UTRAN, configure the carrier frequency bins in the MeasObjectEUTRA as the EARFCN of the neighboring cell of the E-UTRAN needing to be measured by the UE, configure the cellForWhichToReportCGI as the PCI of the neighboring cell of the E-UTRAN needing to be measured by the UE, configure the measurement report trigger type in the ReportConfigEUTRA as the periodic trigger, and configure the purpose of the periodic trigger as the reportCGI.

In some embodiments of the present disclosure, the first generation module 91 includes a third generation unit 913. The third generation unit 913 is configured to, in case of determining to configure the UE to perform measurement to the neighboring cell of the MF or the neighboring cell of the LAA, generate the measurement configuration for the neighboring cell of the MF or the neighboring cell of the LAA, wherein the measurement object configuration IE is the measurement object configuration IE of the E-UTRAN, the measurement object is configured by using the measurement object configuration IE of the E-UTRAN: the measurement report configuration IE is the measurement report configuration IE of the E-UTRAN, and the measurement report is configured by using the measurement report configuration IE of the E-UTRAN; and the measurement object configuration IE of the E-UTRAN is used to indicate that the measurement configuration is a measurement configuration for both the MF and the LAA.

The first reception module 93 further includes a determination unit 931. The determination unit 931 is configured to determine whether the measurement result report IE is a measurement result of the MF or a measurement result of the LAA, by determining whether the measurement result report IE in the measurement result message includes the CGI information of the neighboring cell measured by the UE or not, wherein the measurement result report IE is the measurement result report IE of the E-UTRAN.

Optionally, the determination unit 931 is configured to determine whether the measurement result report IE in the measurement result message includes the CGI information of the neighboring cell measured by the UE; in case that the measurement result report IE includes the CGI information of the neighboring cell measured by the UE, determine that the measurement result report IE is for the measurement result of the MF; and in case that the measurement result report IE does not include the CGI information of the neighboring cell measured by the UE, determine that the measurement result report IE is for the measurement result of the LAA.

In the above embodiments, the first generation unit 91 is further configured to: in case of determining to configure the UE to perform the measurement to the neighboring cell of the E-UTRAN or the LAA, generate the measurement configuration for the neighboring cell of the E-UTRAN or the LAA, wherein the measurement object configuration IE is the measurement object configuration IE of the E-UTRAN, and the measurement object of the neighboring cell of the E-UTRAN or the LAA is configured by using the measurement object configuration IE of the E-UTRAN; the measurement report configuration IE is the measurement report configuration IE of the E-UTRAN, and the measurement report of the neighboring cell of the E-UTRAN or the LAA is configured by using the measurement report configuration IE of the E-UTRAN, and the combination of the measurement object configuration IE of the E-UTRAN and the measurement report configuration IE of the E-UTRAN is used to indicate the RAT type of the measurement configuration is the E-UTRAN or the LAA; and the first generation unit 91 is further configured to: in case of determining to configure the UE to perform measurement to the neighboring cell of the WLAN, generate the measurement configuration for the neighboring cell of the WLAN, wherein the measurement object configuration IE is the measurement object configuration IE of the WLAN, the measurement object of the cell of the WLAN is configured by using the measurement object configuration IE of the WLAN; the measurement report configuration IE is the measurement report configuration IE of the inter-RAT, and the measurement report of the cell of the WLAN is configured by using the measurement report configuration IE of the inter-RAT, and the combination of the measurement object configuration IE of the WLAN and the measurement report configuration IE of the inter-RAT is used to indicate that the RAT type of the measurement configuration is the WLAN.

Specifically, the measurement object configuration IE of the E-UTRAN is the MeasObjectEUTRA, the measurement report configuration IE of the E-UTRAN is the ReportConfigEUTRA. The measurement object configuration IE of the WLAN is the MeasObjectWLAN-r13, and the measurement report configuration IE of the inter-RAT is the ReportConfigInterRAT.

Optionally, the base station 9 further includes: an obtaining module 94, configured to obtain the PCI of the neighboring cell measured by the UE and the channel quality measurement result from the measurement result report IE in the measurement result message; a query module 95, configured to query whether the PCI of the neighboring cell measured by the UE has corresponding CGI information or not; a second generation module 96, configured to, in case that the PCI of the neighboring cell measured by the UE included in the measurement result message has no corresponding CGI information, generate a second measurement configuration for the neighboring cell measured by the UE, wherein the second measurement configuration includes the measurement object configuration IE and the measurement report configuration IE of the neighboring cell measured by the UE, and the combination of the measurement object configuration IE and the measurement report configuration IE is used to indicate the RAT type of the second measurement configuration; a second transmission module 97, configured to transmit the second measurement configuration to the UE so as to instruct the UE to report the CGI information of the neighboring cell measured by the UE; and a second reception module 98, configured to receive the CGI information which is reported by the UE according to the second measurement configuration and corresponds to the neighboring cell measured by the UE.

In some embodiments of the present disclosure, the second generation module 96 includes a fourth generation unit 961. The fourth generation unit 961 is configured to: in case that the neighboring cell measured by the UE is the neighboring cell of the MF or the neighboring cell of the E-UTRAN, generate the second measurement configuration for the neighboring cell of the MF or the neighboring cell of the E-UTRAN, wherein the measurement object configuration IE in the second measurement configuration is the measurement object configuration IE of the E-UTRAN, and the measurement object is configured by using the measurement object configuration IE of the E-UTRAN: and the measurement report configuration IE in the second measurement configuration is the measurement report configuration IE of the E-UTRAN, and the measurement report is configured by using the measurement report configuration IE of the E-UTRAN; and the measurement result report IE is the measurement result report IE of the E-UTRAN, and the measurement result transmitted by the UE is received through the measurement result report IE of the E-UTRAN.

The combination of the measurement object configuration IE and the measurement report configuration IE being used to indicate the RAT type of the second measurement configuration, includes: using the combination of the EARFCN in the measurement object configuration IE of the E-UTRAN and the measurement purpose IE in the measurement report configuration IE of the E-UTRAN to indicate the RAT type of the second measurement configuration.

In some other embodiments of the present disclosure, the second generation module 96 includes a fifth generation unit 962. The fifth generation unit 962 is configured to, in case that the neighboring cell measured by the UE is the neighboring cell of the ME generate the second measurement configuration for the neighboring cell of the MF, wherein the measurement object configuration IE in the second measurement configuration is the measurement object configuration IE of the WLAN, the measurement object for the neighboring cell of the MF is configured by using the measurement object configuration IE of the WLAN: the measurement report configuration IE in the second measurement configuration is the measurement report configuration IE of the E-UTRAN, and the measurement report of the neighboring cell of the MF is configured by using the measurement report configuration IE of the E-UTRAN.

The measurement result report IE is the measurement result report IE of the E-UTRAN, and the measurement result of the neighboring cell of the MF transmitted by the UE is received through the measurement result report IE of the E-UTRAN.

The combination of the measurement object configuration IE and the measurement report configuration IE being used to indicate the RAT type of the second measurement configuration, includes: using the combination of the measurement object configuration IE of the WLAN and the measurement report configuration IE of the E-UTRAN to indicate that the RAT type of the second measurement configuration is the MF.

Figure 10:
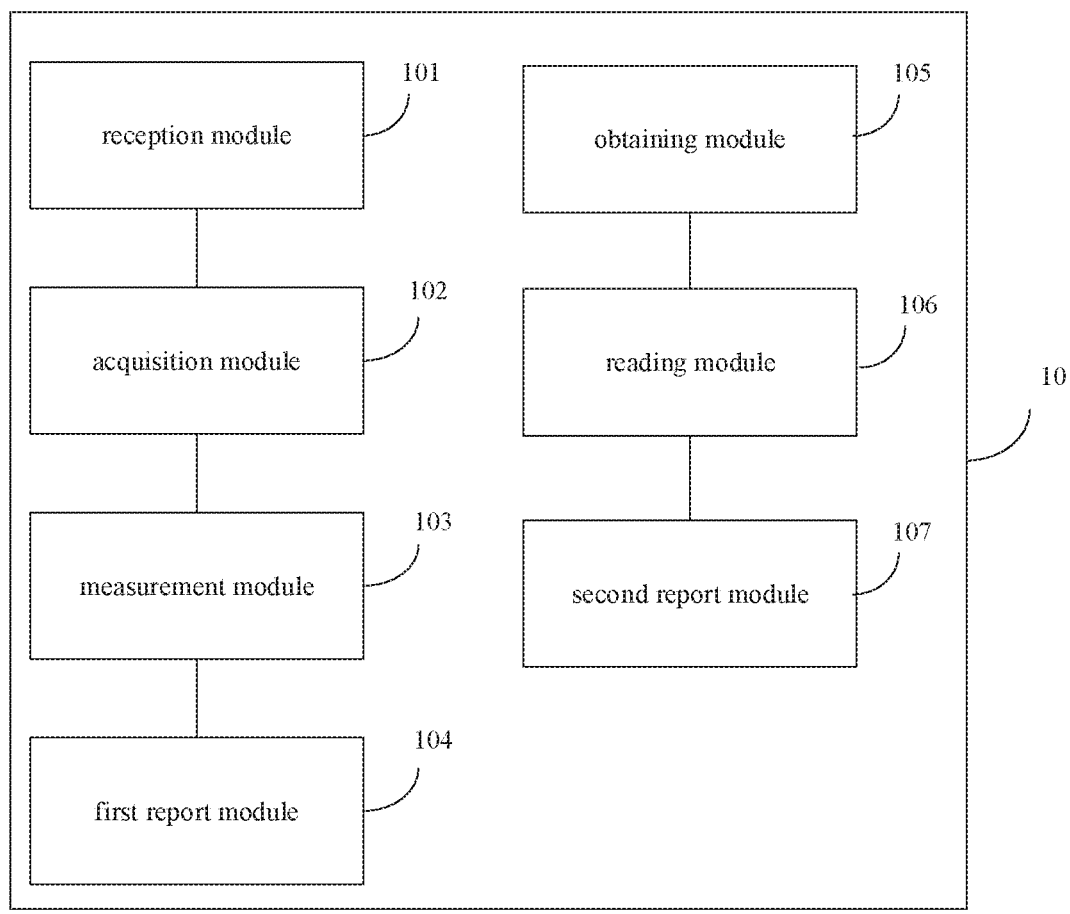
FIG. 10 is a structural schematic diagram of a User Equipment (UE) according to some embodiments of the present disclosure.

Referring to FIG. 10, some embodiments of the present disclosure further provide a User Equipment (UE) 10. The UE 10 includes: a reception module 101, configured to receive a measurement configuration transmitted from a base station, wherein the measurement configuration includes a measurement object configuration IE and a measurement report configuration IE of a neighboring cell needing to be measured by the UE; an acquisition module 102, configured to acquire a RAT type of the measurement configuration according to the measurement object configuration IE or a combination of the measurement object configuration IE and the measurement report configuration IE: a measurement module 103, configured to perform measurement to a measurement object indicated in the measurement configuration; a first report module 104, configured to transmit a channel quality measurement result of the neighboring cell indicated in the measurement configuration to the base station through the measurement result report IE, in case that the channel quality measurement result satisfies a measurement report rule indicated by the measurement report configuration IE included in the measurement configuration.

In some embodiments of the present disclosure, the acquisition module 102 is specifically configured to, in case that the measurement object configuration IE in the measurement configuration received by the UE is the measurement object configuration IE of the WLAN, and the measurement report configuration IE is the measurement report configuration IE of the E-UTRAN, determine that the measurement configuration is for the measurement to the neighboring cell of the MF.

Specifically, the measurement object configuration IE of the WLAN is the MeasObjectWLAN-r13, and the measurement report configuration IE of the E-UTRAN is the ReportConfigEUTRA.

Optionally, the measurement module 103 is specifically configured to, obtain the operating frequency band of the neighboring cell of the MF needing to be measured by the UE, according to the measurement object frequency-band information included in the measurement object configuration IE of the WLAN; obtain the channel numbers in the carrier information included in the measurement object configuration IE of the WLAN: obtain the EARFCN of the neighboring cell of the MF needing to be measured by the UE, according to the operating frequency band and the channel numbers; and measure a channel quality of the neighboring cell of the MF at the EARFCN.

Optionally, the measurement module 103 is specifically configured to: convert the WLAN channel numbers in the carrier information included in the measurement object configuration IE of the WLAN to the EARFCN of the MF according to the predetermined correspondence relation between the EARFCN of the MF and the WLAN channel numbers, so as to obtain the EARFCN of the neighboring cell of the MF needing to be measured by the UE.

In some embodiments of the present disclosure, the measurement object configuration IE in the measurement configuration received by the UE is the measurement object configuration IE of the E-UTRAN, and the measurement report configuration IE is the measurement report configuration IE of the E-UTRAN. The acquisition module 102 is specifically configured to acquire the RAT type of the measurement configuration through the EARFCN of the neighboring cell needing to be measured by the UE in the measurement object configuration IE and the measurement purpose IE in the measurement report configuration IE.

In some embodiments of the present disclosure, the acquisition module 102 is specifically configured to: in case that the measurement report trigger type in the measurement purpose IE in the measurement report configuration IE of the E-UTRAN is configured as the periodic trigger, a purpose of the periodic trigger is configured as the reportCGI, and the carrier frequency bins in the measurement object configuration IE of the E-UTRAN is the EARFCN of the MF, determine that the RAT type of the measurement configuration is the MF; and in case that the measurement report trigger type in the measurement purpose IE in the measurement report configuration IE of the E-UTRAN is configured as the periodic trigger, the purpose of the periodic trigger is configured as the reportCGI, and the carrier frequency bins in the measurement object configuration IE of the E-UTRAN are the EARFCN of the E-UTRAN, determine that the RAT type of the measurement configuration is the E-UTRAN.

The UE 10 further includes an obtaining module 105, configured to obtain, from the measurement object configuration IE in the measurement configuration, the PCI of the neighboring cell of the MF of which the CGI needs to be reported; a reading module 106, configured to read the CGI information in the system broadcast of the neighboring cell of the MF corresponding to the PCI; a second report module 107, configured to transmit to the base station the read CGI information by using the measurement result report IE in the measurement result message.

In some embodiments of the present disclosure, the acquisition module 102 is specifically configured to acquire that the RAT type of the measurement configuration is the MF or the LAA, in case that the measurement object configuration IE in the measurement configuration received by the UE is the measurement object configuration IE of the E-UTRAN, and the measurement report configuration IE is the measurement report configuration IE of the E-UTRAN, and the carrier frequency bins in the measurement object configuration IE of the E-UTRAN are the EARFCN of the MF or of the LAA.

The measurement module 103 is specifically configured to perform the channel quality measurement to the neighboring cell of the MF and the channel quality measurement to the neighboring cell of the LAA simultaneously at the EARFCN specified in the measurement object configuration IE of the E-UTRAN.

The first report module 104 is specifically configured to: in case that the measurement result of the channel quality measurement to the neighboring cell of the MF or the measurement result of the channel quality measurement to the neighboring cell of the LAA satisfies the measurement report rule indicated in the measurement report configuration IE included in the measurement configuration, transmit to the base station the measurement result of the channel quality measurement to the neighboring cell of the MF or the measurement result of the channel quality measurement to the neighboring cell of the LAA by using the measurement result report IE of the E-UTRAN in the measurement result message, wherein in case that the UE detects the neighboring cell of the MF at the specified EARFCN and the measurement result of the measurement to the detected neighboring cell of the MF satisfies the measurement report rule indicated in the measurement report configuration IE included in the measurement configuration, the first report module 104 reads system broadcast messages of the detected neighboring cell of the MF, obtains the CGI information of the detected neighboring cell of the ME, incorporates the CGI information in the measurement result report IE of the detected neighboring cell of the MF, and transmits the measurement result report IE to the base station, so that the base station may determine whether the measurement result report IE is the measurement result report IE of the neighboring cell of the MF or the measurement result report IE of the neighboring cell of the LAA by judging whether the measurement result report IE includes the CGI information or not.

In the embodiments of the present disclosure, the first report module 104 is specifically configure to, incorporate the measurement result of the neighboring cell of the MF and the measurement result of the neighboring cell of the LAA in different measurement result report IEs of the E-UTRAN in one measurement result message to be sent to the base station or incorporate the measurement result of the neighboring cell of the MF and the measurement result of the neighboring cell of the LAA in different measurement result messages to be sent to the base station.

In some embodiments of the present disclosure, the acquisition module 102 is specifically configured to, in case that the measurement object configuration IE in the measurement configuration received by the UE is the measurement object configuration IE of the E-UTRAN and the measurement report configuration IE is the measurement report configuration IE of the E-UTRAN, determine that the measurement configuration is for the measurement to the neighboring cell of the LAA or the neighboring cell of the E-UTRAN; in case that the measurement object configuration IE in the measurement configuration received by the UE is the measurement object configuration IE of the WLAN, and the measurement report configuration IE is the measurement report configuration IE of the inter-RAT, determine that the measurement configuration is for the measurement to the neighboring cell of the WLAN.

Specifically, the measurement object configuration IE of the E-UTRAN is the MeasObjectEUTRA, and the measurement report configuration IE of the E-UTRAN is the ReportConfigEUTRA; the measurement object configuration IE of the WLAN is the MeasObjectWLAN-r13, and the measurement report configuration IE of the inter-RAT is the ReportConfigInterRAT.

In the above embodiments, the first report module 104 is specifically configured to: in case that the RAT type of the measurement configuration is the MF, or the LAA or the E-UTRAN, and the measurement result report IE is the measurement result report IE of the E-UTRAN, transmit the channel quality measurement result to the base station through the measurement result report IE of the E-UTRAN.

In the above embodiments, in case that the measurement configuration indicates measurement to a plurality of EARFCNs in the MF, the measurement result message indicates the EARFCN in the MF being measured or each measurement result report IE in the measurement result message indicates the EARFCN in the MF being measured.

In the above embodiments, in case that the measurement configuration indicates measurement to one EARFCN in the MF, the measurement result message may not indicate the EARFCN in the MF being measured.

Figure 11:
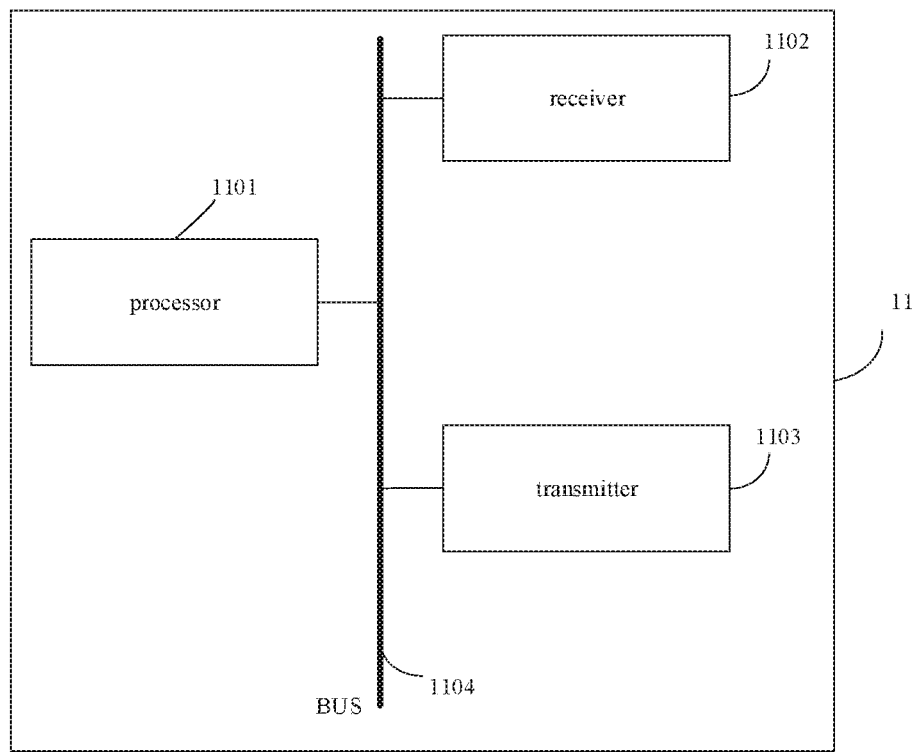
FIG. 11 is a structural schematic diagram of a base station according to some embodiments of the present disclosure.

Some embodiments of the present disclosure further provide a base station 11. Referring to FIG. 11, the base station 11 includes a processor 1101, a receiver 1102 and a transmitter 1103. The processor 1101 is configured to, in case of determining to configure a UE to perform measurement to a neighboring cell, generate a measurement configuration for the neighboring cell, wherein the measurement configuration includes a measurement object configuration Information Element (IE) and a measurement report configuration IE, and the measurement object configuration IE or a combination of the measurement object configuration IE and the measurement report configuration IE is used to indicate a radio access technology (RAT) type of the measurement configuration. The transmitter 1103 is connected to the processor 1101 through a bus 1104 and is configured to transmit the measurement configuration to the UE so as to instruct the UE to perform measurement to a measurement object indicated in the measurement configuration. The receiver 1102 is connected to the processor 1101 through the bus 1104 and is configured to receive the measurement result message transmitted by the UE through the measurement result report IE after the UE performs the measurement to the measurement object.

Figure 12:
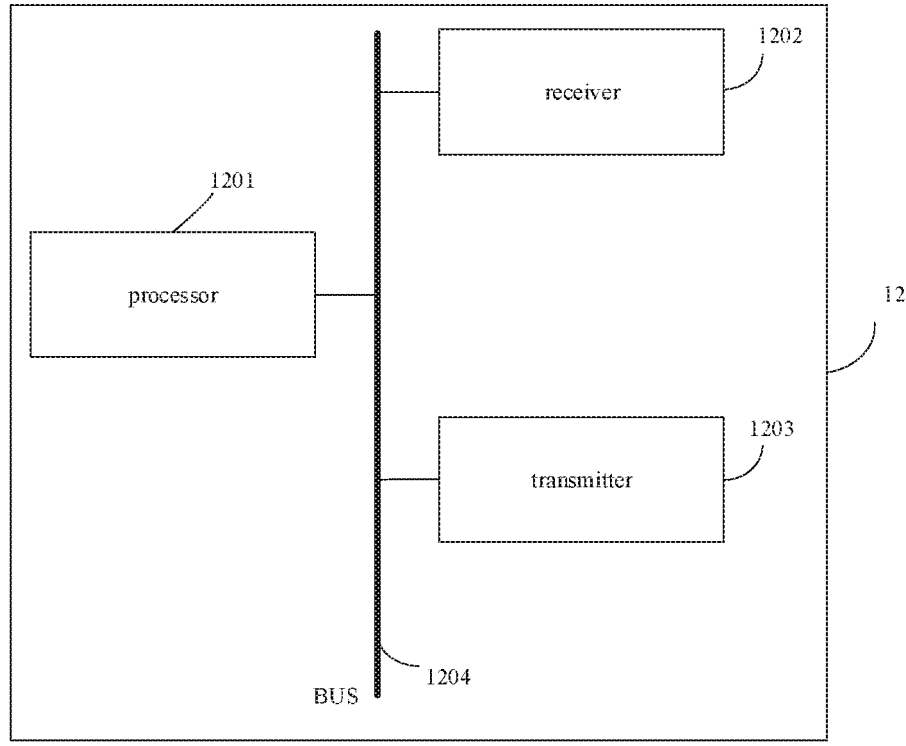
FIG. 12 is a structural schematic diagram of a UE according to some embodiments of the present disclosure.

Some embodiments of the present disclosure further provide a user equipment (UE) 12. Referring to FIG. 12, the UE 12 includes a processor 1201, a receiver 1202 and a transmitter 1203. The receiver 1202 is configured to receive a measurement configuration transmitted from a base station, wherein the measurement configuration includes a measurement object configuration IE and a measurement report configuration IE for a neighboring cell needing to be measured by the UE. The processor 1201 is connected to the receiver 1202 through the bus 1204 and is configured to obtain a RAT type of the measurement configuration according to the measurement object configuration IE or a combination of the measurement object configuration IE and the measurement report configuration IE: and perform measurement to the measurement object indicated in the measurement configuration. The transmitter 1203 is connected to the processor 1201 through the bus 1204 and is configured to transmit, to the base station through the measurement result report IE, a channel quality measurement result of the neighboring cell indicated in the measurement configuration, in case that the channel quality measurement result satisfies a measurement report rule indicated by the measurement report configuration IE included in the measurement configuration.

The UE in the embodiments of the present disclosure may be a mobile phone (or a handset), or other devices capable of transmitting or receiving wireless signals including a UE (terminal), a personnel digital assistance (PDA), a wireless modem, a wireless communication device, a handhold device, a laptop, a wireless phone, a wireless local loop (WLL) station, a Customer Premise of Equipment (CPE) or a MiFi capable of transforming a cellular signal to a WiFi signal, an intelligent household electrical appliance, or other devices capable of automatically communicating with a mobile communication network without operations of a user.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for distinguishing a measurement object, the method being applied in a base station and comprising:
    in case of determining to configure a User Equipment (UE) to perform measurement to a neighboring cell, generating a measurement configuration for the neighboring cell, wherein the measurement configuration comprises a measurement object configuration Information Element (IE) and a measurement report configuration IE for a Radio Access Technology (RAT) provided in a Radio Resource Control (RRC) protocol, and the measurement object configuration IE or a combination of the measurement object configuration IE and the measurement report configuration IE is used to indicate a RAT type of the measurement configuration;
    transmitting the measurement configuration to the UE so as to instruct the UE to perform measurement to a measurement object indicated in the measurement configuration; and
    receiving a measurement result message, the measurement result message being transmitted by the UE through a measurement result report IE after the UE performs the measurement to the measurement object.

2. The method for distinguishing a measurement object according to claim 1, wherein, the in case of determining to configure the UE to perform measurement to the neighboring cell, generating the measurement configuration for the neighboring cell, comprises:
    in case of determining to configure the UE to perform measurement to a neighboring cell of a MulteFire (MF), generating a measurement configuration for the neighboring cell of the MF, wherein the measurement object configuration IE is a measurement object configuration IE of a Wireless Local Area Network (WLAN), and the measurement object for the neighboring cell of the MF is configured by using the measurement object configuration IE of the WLAN; the measurement report configuration IE is a measurement report configuration IE of an Evolved-UMTS Terrestrial Radio Access network (E-UTRAN), and the measurement report configuration IE for the neighboring cell of the MF is configured by using the measurement report configuration IE of the E-UTRAN, and a combination of the measurement object configuration IE of the WLAN and the measurement report configuration IE of the E-UTRAN is used to indicate that the RAT type of the measurement configuration is the MF;
    receiving the measurement result message, the measurement result message being transmitted by the UE through the measurement result report IE after the UE performs the measurement to the measurement object, comprises:
    in case of configuring the UE to perform the measurement to the neighboring cell of the MF, receiving the measurement result message transmitted by the UE through the measurement result report IE of the E-UTRAN after the UE performs the measurement to the measurement object.

3. The method for distinguishing a measurement object according to claim 2, wherein the measurement object configuration IE of the WLAN is MeasObjectWLAN-r13, the measurement report configuration IE of the E-UTRAN is ReportConfigEUTRA, and the measurement result report IE of the E-UTRAN is MeasResultEUTRA.

4. The method for distinguishing a measurement object according to claim 3, wherein, the generating the measurement configuration for the neighboring cell of the MF, comprises:
    configuring measurement object frequency-band information comprised in the measurement object configuration IE of the WLAN as an operating frequency band of the neighboring cell of the MF needing to be measured by the UE; and
    configuring channel numbers in carrier information comprised in the measurement object configuration IE of the WLAN according to the E-UTRAN Absolute Radio Frequency Channel Number (EARFCN) of the neighboring cell of the MF needing to be measured by the UE.

5. The method for distinguishing a measurement object according to claim 3, wherein, configuring the channel numbers in the carrier information comprised in the measurement object configuration IE of the WLAN according to the EARFCN of the neighboring cell of the MF needing to be measured by the UE, comprises:
converting the EARFCN of the neighboring cell of the MF needing to be measured by the UE to WLAN channel numbers corresponding to the EARFCN, according to a predetermined correspondence relation between the EARFCN of the MF and the WLAN channel numbers; and
configuring the channel numbers in the carrier information comprised in the measurement object configuration IE of the WLAN as the converted WLAN channel numbers.

6. The method for distinguishing a measurement object according to claim 1, wherein, the in case of determining to configure the UE to perform measurement to the neighboring cell, generating the measurement configuration for the neighboring cell, comprises:
in case of determining to configure the UE to perform measurement to a neighboring cell of an Evolved-UMTS Terrestrial Radio Access network (E-UTRAN) or a neighboring cell of a MulteFire (MF), generating the measurement configuration for the neighboring cell of the E-UTRAN or the neighboring cell of the MF, wherein the measurement object configuration IE is a measurement object configuration IE of the E-UTRAN, and the measurement object is configured by using the measurement object configuration IE of the E-UTRAN; and the measurement report configuration IE is a measurement report configuration IE of the E-UTRAN, and a measurement report is configured by using the measurement report configuration IE of the E-UTRAN;
the combination of the measurement object configuration IE and the measurement report configuration IE being used to indicate the RAT type of the measurement configuration, comprises:
using a combination of E-UTRAN Absolute Radio Frequency Channel Number (EARFCN) in the measurement object configuration IE of the E-UTRAN and a measurement purpose IE in the measurement report configuration IE of the E-UTRAN to indicate the RAT type in the measurement configuration.

7. The method for distinguishing a measurement object according to claim 1, wherein, the in case of determining to configure the UE to perform measurement to the neighboring cell, generating the measurement configuration for the neighboring cell, comprises:
in case of determining to configure the UE to perform measurement to a neighboring cell of MulteFire (MF) or a neighboring cell of Licensed Assistant Access (LAA), generating the measurement configuration for the neighboring cell of the MF or the neighboring cell of the LAA, wherein the measurement object configuration IE is a measurement object configuration IE of Evolved-UMTS Terrestrial Radio Access network (E-UTRAN), the measurement object is configured by using the measurement object configuration IE of the E-UTRAN; the measurement report configuration IE is a measurement report configuration IE of the E-UTRAN, and a measurement report is configured by using the measurement report configuration IE of the E-UTRAN, and the measurement object configuration IE of the E-UTRAN is used to indicate that the measurement configuration is for both the MF and the LAA;
after receiving the measurement result message transmitted by the UE through the measurement result report IE after the UE performs the measurement to the measurement object, the method further comprises:
determining the measurement result report IE is for a measurement result of the MF or a measurement result of the LAA, by determining whether the measurement result report IE in the measurement result message comprises Cell Global Identifier (CGI) information of the neighboring cell measured by the UE or not, wherein the measurement result report IE is the measurement result report IE of the E-UTRAN.

8. The method for distinguishing a measurement object according to claim 1, wherein, the in case of determining to configure the UE to perform measurement to the neighboring cell, generating the measurement configuration for the neighboring cell, comprises:
in case of determining to configure the UE to perform measurement to a neighboring cell of Evolved-UMTS Terrestrial Radio Access network (E-UTRAN) or a neighboring cell of Licensed Assistant Access (LAA), generating the measurement configuration for the neighboring cell of the E-UTRAN or the neighboring cell of the LAA, wherein the measurement object configuration IE is a measurement object configuration IE of the E-UTRAN, and the measurement object for the neighboring cell of the E-UTRAN or the neighboring cell of the LAA is configured by using the measurement object configuration IE of the E-UTRAN; the measurement report configuration IE is a measurement report configuration IE of the E-UTRAN, and a measurement report of the neighboring cell of the E-UTRAN is configured by using the measurement report configuration IE of the E-UTRAN, and a combination of the measurement object configuration IE of the E-UTRAN and the measurement report configuration IE of the E-UTRAN is used to indicate that the RAT type of the measurement configuration is the E-UTRAN or the LAA;
in case of determining to configure the UE to perform measurement to a neighboring cell of Wireless Local Area Network (WLAN), generating the measurement configuration for a neighboring cell of the WLAN, wherein the measurement object configuration IE is a measurement object configuration IE of the WLAN, and the measurement object for the cell of the WLAN is configured by using the measurement object configuration IE of the WLAN; the measurement report configuration IE is a measurement report configuration IE of inter-RAT, and a measurement report of the cell of the WLAN is configured by using the measurement report configuration IE of the inter-RAT, and a combination of the measurement object configuration IE of the WLAN and the measurement report configuration IE of the inter-RAT is used to indicate that the RAT type of the measurement configuration is the WLAN.

9. The method for distinguishing a measurement object according to claim 1, wherein after the receiving the measurement result message transmitted by the UE through the measurement result report IE after the UE performs the measurement to the measurement object, the method further comprises:

obtaining a Physical Cell Identifier (PCI) of the neighboring cell measured by the UE and a channel quality measurement result from the measurement result report IE in the measurement result message;

querying whether the PCI of the neighboring cell measured by the UE has Cell Global Identifier (CGI) information corresponding to the neighboring cell;

in case that the PCI of the neighboring cell measured by the UE in the measurement result message has no CGI information corresponding to the neighboring cell, generating a second measurement configuration for the neighboring cell measured by the UE, wherein the second measurement configuration comprises a measurement object configuration IE and a measurement report configuration IE for the neighboring cell measured by the UE, and the combination of the measurement object configuration IE and the measurement report configuration IE is used to indicate a RAT type of the second measurement configuration;

transmitting the second measurement configuration to the UE so as to instruct the UE to report the CGI information of the neighboring cell measured by the UE; and receiving the CGI information which is reported by the UE according to the second measurement configuration and corresponds to the neighboring cell measured by the UE.

10. The method for distinguishing a measurement object according to claim 9, wherein, the generating the second measurement configuration for the neighboring cell measured by the UE, comprises:

in case that the neighboring cell measured by the UE is a neighboring cell of MulteFire (MF) or a neighboring cell of Evolved-UMTS Terrestrial Radio Access network (E-UTRAN), generating the second measurement configuration for the neighboring cell of the MF or the neighboring cell of the E-UTRAN, wherein the measurement object configuration IE in the second measurement configuration is a measurement object configuration IE of the E-UTRAN, and the measurement object is configured by using the measurement object configuration IE of the E-UTRAN; the measurement report configuration IE in the second measurement configuration is a measurement report configuration IE of the E-UTRAN, and a measurement report is configured by using the measurement report configuration IE of the E-UTRAN;

the combination of the measurement object configuration IE and the measurement report configuration IE being used to indicate the RAT type of the second measurement configuration, comprises:

using a combination of E-UTRAN Absolute Radio Frequency Channel Number (EARFCN) in the measurement object configuration IE of the E-UTRAN and a measurement purpose IE in the measurement report configuration IE of the E-UTRAN to indicate the RAT type of the second measurement configuration;

the receiving the CGI information which is reported by the UE according to the second measurement configuration and corresponds to the neighboring cell measured by the UE, comprises:

receiving, through the measurement result report IE of the E-UTRAN, the CGI information which is reported by the UE according to the second measurement configuration and corresponds to the neighboring cell measured by the UE; and/or the generating the second measurement configuration for the neighboring cell measured by the UE, comprises:

in case that the neighboring cell measured by the UE is the neighboring cell of the MF, generating the second measurement configuration for the neighboring cell of the MF, wherein the measurement object configuration IE in the second measurement configuration is a measurement object configuration IE of Wireless Local Area Network (WLAN), and the measurement object of the neighboring cell of the MF is configured by using the measurement object configuration IE of the WLAN; the measurement report configuration IE in the second measurement configuration is a measurement report configuration IE of Evolved-UMTS Terrestrial Radio Access network (E-UTRAN), and a measurement report of the neighboring cell of the MF is configured by using the measurement report configuration IE of the E-UTRAN;

the combination of the measurement object configuration IE and the measurement report configuration IE being used to indicate the RAT type of the second measurement configuration, comprises: using the combination of the measurement object configuration IE of the WLAN and the measurement report configuration IE of the E-UTRAN to indicate that the RAT type of the second measurement configuration is the MF;

the receiving the CGI information which is reported by the UE according to the second measurement configuration and corresponds to the neighboring cell measured by the UE, comprises:

receiving, through the measurement result report IE of the E-UTRAN, the CGI information which is reported by the UE according to the second measurement configuration and corresponds to the neighboring cell measured by the UE.

11. A method for distinguishing a measurement object, the method being applied in a User Equipment (UE) and comprising:

receiving a measurement configuration transmitted from a base station, wherein the measurement configuration comprises a measurement object configuration IE and a measurement report configuration IE for a neighboring cell needing to be measured by the UE, and the measurement object configuration IE and the measurement report configuration IE are used for a Radio Access Technology (RAT) provided in a Radio Resource Control (RRC) protocol;

obtaining a RAT type of the measurement configuration according to the measure object configuration Information Element (IE) or a combination of the measurement object configuration IE and the measurement report configuration IE;

performing measurement to a measurement object indicated in the measurement configuration;

transmitting, to the base station through a measurement result report IE, a channel quality measurement result of the neighboring cell indicated in the measurement configuration, in case that the channel quality measurement result satisfies a measurement report rule indicated by the measurement report configuration IE comprised in the measurement configuration.

12. The method for distinguishing a measurement object according to claim 11, wherein, the obtaining the RAT type of the measurement configuration, comprises:

in case that the measurement object configuration IE in the measurement configuration received by the UE is a measurement object configuration IE of the Wireless Local Area Network (WLAN), and the measurement report configuration IE is a measurement report configuration IE of Evolved-UMTS Terrestrial Radio Access network (E-UTRAN), determining that the measurement configuration is for measurement to a neighboring cell of MulteFire (MF).

13. The method for distinguishing a measurement object according to claim 12, wherein the performing measurement to the measurement object indicated in the measurement configuration, comprises:
    obtaining operating frequency bands of the neighboring cell of the MF needing to be measured by the UE, according to measurement object frequency-band information comprised in the measurement object configuration IE of the WLAN;
    obtaining channel numbers in carrier information comprised in the measurement object configuration IE of the WLAN, and obtaining E-UTRAN Absolute Radio Frequency Channel Number (EARFCN) of the neighboring cell of the MF needing to be measured by the UE, according to the operating frequency bands and the channel numbers; and
    measuring a channel quality of the neighboring cell of the MF according to the EARFCN.

14. The method for distinguishing a measurement object according to claim 11, wherein, the measurement object configuration IE in the measurement configuration received by the UE is a measurement object configuration IE of Evolved-UMTS Terrestrial Radio Access network (E-UTRAN), and the measurement report configuration IE is a measurement report configuration IE of the E-UTRAN;
    the obtaining the RAT type of the measurement configuration according to the combination of the measurement object configuration IE and the measurement report configuration IE, comprises:
    obtaining the RAT type of the measurement configuration through E-UTRAN Absolute Radio Frequency Channel Number (EARFCN) of the neighboring cell needing to be measured by the UE in the measurement object configuration IE and a measurement purpose IE in the measurement report configuration IE.

15. The method for distinguishing a measurement object according to claim 11, wherein, in case that the RAT type of the measurement configuration is determined as MulteFire (MF), the method further comprises:
    obtaining a Physical Cell Identifier (PCI) of a neighboring cell of the MF of which CGI information needs to be reported, from the measurement object configuration IE in the measurement configuration;
    reading the CGI information in a system broadcast of the neighboring cell of the MF corresponding to the PCI; and
    transmitting the read CGI information to the base station through the measurement result report IE in a measurement result message.

16. The method for distinguishing a measurement object according to claim 11, wherein, the obtaining the RAT type of the measurement configuration, comprises:
    obtaining the RAT type of the measurement configuration is MulteFire (MF) or Licensed Assistant Access (LAA), in case that the measurement object configuration IE in the measurement configuration received by the UE is a measurement object configuration IE of an Evolved-UMTS Terrestrial Radio Access network (E-UTRAN), and the measurement report configuration IE is a measurement report configuration IE of the E-UTRAN, and carrier frequency bins in the measurement object configuration IE of the E-UTRAN are E-UTRAN Absolute Radio Frequency Channel Numbers (EARFCNs) of the MF or the LAA;
    the performing measurement to the measurement object indicated in the measurement configuration, comprises:
    performing channel quality measurement to a neighboring cell of the MF and channel quality measurement to a neighboring cell of the LAA simultaneously at the EARFCN specified in the measurement object configuration IE of the E-UTRAN;
    after the performing measurement to the measurement object indicated in the measurement configuration, the method further comprises:
    in case that a measurement result of the channel quality measurement to the neighboring cell of the MF or a measurement result of the channel quality measurement to the neighboring cell of the LAA satisfies a measurement report rule indicated in the measurement report configuration IE comprised in the measurement configuration, transmitting, to the base station, the measurement result of the channel quality measurement to the neighboring cell of the MF or the measurement result of the channel quality measurement to the neighboring cell of the LAA by using the measurement result report IE of the E-UTRAN in the measurement result message,
    wherein in case that the UE detects the neighboring cell of the MF at the specified EARFCN and a measurement result of the measurement to the detected neighboring cell of the MF satisfies the measurement report rule indicated in the measurement report configuration IE comprised in the measurement configuration, the UE reads a system broadcast message of the detected neighboring cell of the MF, obtains Cell Global Identifier (CGI) information of the detected neighboring cell of the MF, incorporates the CGI information in the measurement result report IE of the detected neighboring cell of the MF, and transmits the measurement result report IE to the base station, so that the base station determines whether the measurement result report IE is a measurement result report IE of the neighboring cell of the MF or a measurement result report IE of the neighboring cell of the LAA by judging whether the measurement result report IE comprises the CGI information or not.

17. The method for distinguishing a measurement object according to claim 11, wherein, the obtaining the RAT type of the measurement configuration, comprises:
    determining that the measurement configuration received by the UE is for measurement to a neighboring cell of an Evolved-UMTS Terrestrial Radio Access network (E-UTRAN) or measurement to a neighboring cell of a Licensed Assistant Access (LAA), in case that the measurement object configuration IE in the measurement configuration is a measurement object configuration IE of the E-UTRAN and the measurement report configuration IE is a measurement report configuration IE of the E-UTRAN;
    determining that the measurement configuration received by the UE is for measurement to a neighboring cell of a Wireless Local Area Network (WLAN), in case that the measurement object configuration IE in the measurement configuration is a measurement object configuration IE of the WLAN, and the measurement report configuration IE is a measurement report configuration IE of an inter-RAT.

18. The method for distinguishing a measurement object according to claim 11, wherein, transmitting, to the base station through the measurement result report IE, the channel quality measurement result of the neighboring cell indicated in the measurement configuration, comprises:

transmitting, to the base station through a measurement result report IE of an Evolved-UMTS Terrestrial Radio Access network (E-UTRAN), the channel quality measurement result, in case that the RAT type of measurement configuration is MulteFire (MF), Licensed Assistant Access (LAA), or the E-UTRAN, and the measurement result report IE is a measurement result report IE of the E-UTRAN.

19. A base station, comprising:

a processor, a receiver connected to the processor and configured to receive a signal, and a transmitter connected to the processor and configured to transmit a signal, wherein the processor is configured to perform the method according to claim 1 in combination with the transmitter and the receiver.

20. A User Equipment (UE), comprising:

a processor, a receiver connected to the processor and configured to receive a signal, and a transmitter connected to the processor and configured to transmit a signal, wherein, the processor is configured to perform the method according to claim 11 in combination with the transmitter and the receiver.

* * * * *